(12) United States Patent
Petrovich

(10) Patent No.: US 12,134,418 B2
(45) Date of Patent: Nov. 5, 2024

(54) PERSONAL SHOPPING CART

(71) Applicant: MyTrollee Pty Limited, West Hoxton (AU)

(72) Inventor: Vic Petrovich, West Hoxton (AU)

(73) Assignee: MyTrollee Pty Limited, West Hoxton (AU)

( * ) Notice: Subject to any disclaimer, the term of this patent is extended or adjusted under 35 U.S.C. 154(b) by 375 days.

(21) Appl. No.: 17/651,157

(22) Filed: Feb. 15, 2022

(65) Prior Publication Data

US 2022/0258784 A1    Aug. 18, 2022

Related U.S. Application Data

(60) Provisional application No. 63/150,000, filed on Feb. 16, 2021.

(51) Int. Cl.
*B62B 3/02* (2006.01)
*B62B 3/14* (2006.01)

(52) U.S. Cl.
CPC ............ *B62B 3/027* (2013.01); *B62B 3/1444* (2013.01); *B62B 3/1464* (2013.01); *B62B 2202/26* (2013.01); *B62B 2205/22* (2013.01)

(58) Field of Classification Search
CPC ..... B62B 3/027; B62B 3/1444; B62B 3/1464; B62B 3/02; B62B 2202/26; B62B 2205/22
See application file for complete search history.

(56) References Cited

U.S. PATENT DOCUMENTS

| D277,793 | S | * | 2/1985 | Allen | ............................ D34/17 |
| 4,705,247 | A | * | 11/1987 | Delmerico | .............. B62B 3/106 |
| | | | | | 108/118 |
| 8,550,474 | B2 | | 10/2013 | Geva et al. | |
| 8,979,115 | B1 | | 3/2015 | Baron | |
| 2002/0149176 | A1 | | 10/2002 | Miller | |
| 2005/0140119 | A1 | | 6/2005 | Wong | |
| 2008/0258436 | A1 | | 10/2008 | Storm | |

(Continued)

FOREIGN PATENT DOCUMENTS

GB    2 113 625 A    8/1983

OTHER PUBLICATIONS

Shaheen Mahira et al., "Chapter 1 Antimicrobiol Materials—An Overview", Royal Society of Chemistry, 2009, pp. 1-37.

(Continued)

*Primary Examiner* — John D Walters
(74) *Attorney, Agent, or Firm* — Bookoff McAndrews, PLLC

(57) ABSTRACT

A cart may include a first set of lower support arms and a second set of lower support arms, each of the lower support arms having a wheel attached thereto; a first set of upper support arms and a second set of upper support arms; a holding frame coupled to the first set of upper support arms and the second set of upper support arms; a locking mechanism; and a folding mechanism configured to allow the cart to transition between a folded position and unfolded position. During transition, the first set of upper support arms may be moveable relative to the second set of upper support arms; the first set of lower support arms may be moveable relative to the second set of lower support arms; and the first set of upper support arms may be moveable relative to the first set of lower support arms.

20 Claims, 19 Drawing Sheets

(56) References Cited

U.S. PATENT DOCUMENTS

2015/0336599 A1    11/2015  Cheng
2017/0225699 A1*   8/2017  Santelli .................. B62B 3/027
2018/0281836 A1    10/2018  Bacallao

OTHER PUBLICATIONS

International Search Report and Written Opinion mailed May 18, 2022 in International Application No. PCT/IB2022/051343 (16 pages).

* cited by examiner

PERSONAL SHOPPING CART

CROSS-REFERENCE TO RELATED APPLICATIONS

This application claims the benefit of priority from U.S. Provisional Application No. 63/150,000, filed on Feb. 16, 2021, the entirety of which is incorporated herein by reference.

TECHNICAL FIELD

Embodiments of the present disclosure relate generally to hand propelled, wheeled carts and more specifically to shopping carts, and related methods of use thereof.

BACKGROUND

Many carts in the market today may be owned by a grocery store rather than grocery store customers. As a result, it may be more likely that plastic bags are used rather than reusable bags. The use and disposal of plastic bags causes significant environmental issues.

In addition to a higher likelihood of using plastic bags, the use of store owned carts by shoppers may greatly increase the likelihood of bacteria, virus, germ, and disease transmission between customers and/or employees.

Further to these issues, store-owned shopping carts may not be well maintained and may require that a shopper return the shopping cart to a central designated area, which may be time consuming or difficult in certain situations. From the perspective of the grocery store, it may be very time consuming and expensive to maintain a fleet of shopping carts for their customers' use. Shopping carts may be taken away from the store and not returned, may break, and may be expensive for a grocery store to buy. Shopping carts may themselves (in addition to the plastic bags mentioned above) lead to significant environmental harm when disposed of.

As such, there exists a need for alternative devices or methods to enable customers to transport their purchases throughout the store and to their vehicle or home.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, carts and related methods of use thereof are disclosed.

In one example, a cart may include: a first set of lower support arms and a second set of lower support arms, each of the lower support arms having a wheel attached thereto; a first set of upper support arms and a second set of upper support arms; a holding frame coupled to the first set of upper support arms and the second set of upper support arms; a locking mechanism configured to releasably lock the cart in an unfolded position; and a folding mechanism configured to allow the cart to transition between a folded position and unfolded position. During transition: the first set of upper support arms may be moveable relative to the second set of upper support arms; the first set of lower support arms may be moveable relative to the second set of lower support arms; and the first set of upper support arms may be moveable relative to the first set of lower support arms.

In another example, a cart may include: a first set of lower support arms and a second set of lower support arms, each of the lower support arms having a wheel attached thereto; a first set of upper support arms and a second set of upper support arms; a holding frame coupled to the first set of upper support arms and the second set of upper support arms; a locking mechanism configured to releasably lock the cart in an unfolded position; and a folding mechanism configured to allow the cart to move between a folded position and unfolded position. The folding mechanism may include: a first gear coupled to one of the first set of upper support arms; a second gear coupled to one of the second set of upper support arms; and a third gear coupled to one of the second set of lower support arms; wherein the third gear may be meshed with each of the first gear and the second gear; wherein the first gear may have a first diameter, the second gear may have a second diameter, and the third gear may have a third diameter; and wherein the second diameter may be less than the first diameter and less than the third diameter.

In still another example, a cart may include: a first set of lower support arms and a second set of lower support arms, each of the lower support arms having a wheel attached thereto; a first set of upper support arms and a second set of upper support arms; a handle attached to the first set of upper support arms; a holding frame attached to the first set of upper support arms and the second set of upper support arms, the holding frame including a frame folding mechanism configured to allow the holding frame to fold; four bags, the bags being removably attached to the holding frame by a plurality of clips coupled to the bags, the bags being arranged in a two-by-two formation; a locking mechanism including a locking plate and a locking bolt, wherein the locking bolt is configured to be selectively engaged with the locking plate to lock the cart in an unfolded position; and a folding mechanism configured to allow the cart to transition between a folded position and unfolded position. The folding mechanism may include: a first gear coupled to one of the first set of upper support arms; a second gear coupled to one of the second set of upper support arms; and a third gear coupled to one of the second set of lower support arms; wherein the third gear may be meshed with each of the first gear and the second gear. During transition: the first set of upper support arms may be moveable relative to the second set of upper support arms; the first set of lower support arms may be moveable relative to the second set of lower support arms; and the first set of upper support arms may be moveable relative to the first set of lower support arms.

Additional objects and advantages of the disclosed embodiments will be set forth in part in the description that follows, and in part will be apparent from the description, or may be learned by practice of the disclosed embodiments.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
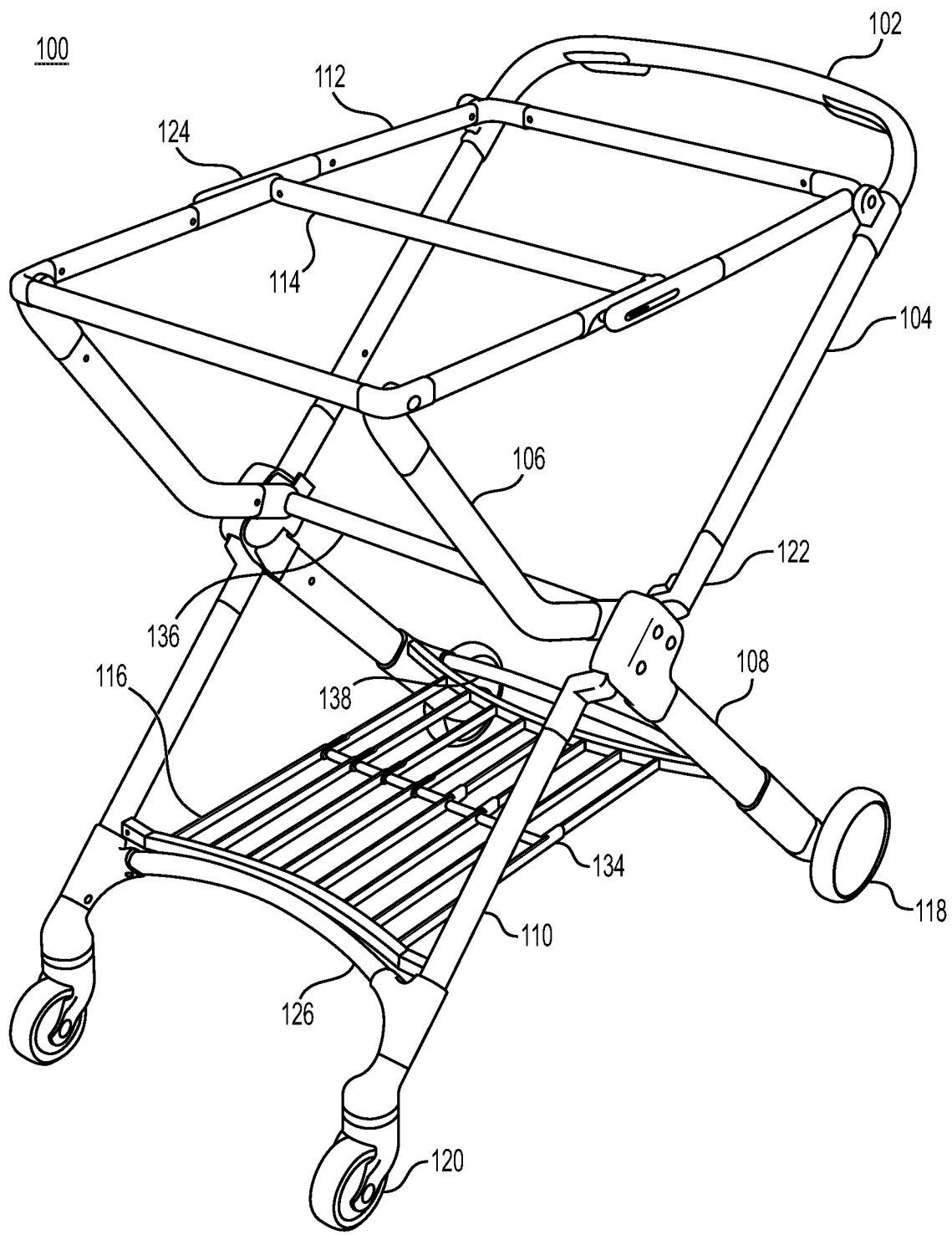
FIG. 1 depicts an isometric view of a cart in an unfolded position without bags according to some embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

The present disclosure relates generally to hand-propelled, wheeled carts and specifically to shopping carts.

The present disclosure includes a device for transporting goods, products, and other items within and outside a store. In particular the device may enable a customer to transport goods from a store to their vehicle or it may be used to transport their items all the way to their home or destination by travelling on foot, bus, train, or by any other mode of conveyance.

Some embodiments may be used as a personal shopping cart. In some embodiments, the cart has an upper portion, a lower portion, a handle, a plurality of support arms, and wheels.

The upper portion may be configured to accommodate and support one or more bags or other detachable compartments. In some embodiments, the upper portion may be a holding frame. In some embodiments, the one or more bags may clip onto the holding frame of the upper portion. The holding frame may be made of any strong material including aluminum, titanium, another metal, plastic, fiber-reinforced plastic, glass fiber-reinforced plastic, wood, one or more composite materials, carbon fiber, fiberglass, a combination of these materials, or any other material known in the art. In some embodiments, the upper portion may be made of a lightweight metal such as aluminum. In addition to supporting the bags, the upper portion of the cart may be connected to a handle on the rear side of the cart and may further be attached to the upper support arms below the upper portion.

In some embodiments, the cart may accommodate four large rectangular bags that may be supported by the upper portion of the cart. Given the improved stability of the cart, these bags may be larger than those typically used with foldable shopping cart designs as the cart may accommodate far more weight without reducing the structural integrity of the design. The bags may be supported by the upper portion of the cart in various ways known in the art. In some embodiments, the bags may be supported by clips. The clips may be attached to the bags and may further be configured to save space when attaching to a middle bar of the upper portion of the cart. For example, the clips may be configured to alternate with or mirror the clips of adjacent bags. With such design, multiple bags may be attached to the same bar without the need for two bars, or a thicker bar. This may maintain a low weight and profile of the cart, which is especially important when folded. This may also allow for the bags to be easily removed from the cart (even when full) one at a time with only one hand, because the clips may enable an upward motion with relatively low force applied to them. One or more of the bags may be insulated, having double wall thickness, while remaining interchangeable with the non-insulated bags as needed. The insulated bags may be lined with aluminum foil that is waterproof and reflective. The insulated bags may also include thermal batting. Each bag may also have a removable lid that fits with the bags, the support bars, and/or the clips. Said lid may further insulate or contain certain foods as needed.

An assortment of smaller bags may also be included for use within the larger bags. These bags may be easily removable with a hook and loop fastener such as Velcro, magnets, clips or another method of attaching the bags such that the bags may be easily removable. Each of said smaller bags may be specifically designed to accommodate a specific type of product. For example, a mesh bag may accommodate certain fruit and vegetables that require better airflow. As another example, an insulated bag may accommodate smaller items that should be kept cool (such as cheese or butter). Said smaller bags may close with a drawstring, a zipper, or any other number of methods known to the art.

The lower portion of said cart may act as a flat platform that can accommodate larger, heavier items that may not otherwise fit in the one or more bags that clip into the upper portion. The lower portion may also increase the overall stability of the cart, stiffen the frame, and/or reduce the likelihood of the cart folding unintentionally. The lower portion may be attached to the lower support arms. The lower platform may be made of any number of strong materials known in the art including plastic, metal, wood, one or more composite materials, carbon fiber, fiberglass, etc. In some embodiments, the platform may be made from a light but strong aluminum. In some embodiments, the platform may be configured as a grate with a multitude of slats rather than one solid platform. Such a design may further reduce the weight of the platform and of the entire cart. The lower portion may further have indentations in the grate that may allow certain products (including, but not limited to bottles and cans) to stay on the platform without rolling off. In some embodiments, the platform includes a spring mechanism that is triggered by a driving force initiated when the structural arms start folding. This causes the platform to fold in unison with the frame of the cart when it is being folded.

The upper and lower portions of the cart may be connected with a multitude of structural support arms. In one embodiment there may be four support arms connected to a central pivot point on each side of the cart. The four support arms may enable the cart to support a much higher capacity of items in the upper portion as compared with carts that only have three structural support arms and require a more complex folding mechanism. Two of said four support arms on each side may be connected to the upper portion of the cart and the handle. Two of said four support arms on each side may be connected to the lower portion of the cart and the wheels.

The cart may be in an operational position or a folded position. In order to enable the transition between these two positions, the cart may have a folding mechanism on each side, central to the support arms. In an embodiment with four support arms, the folding mechanism may be comprised of three gears, a locking plate and bolt, and a folding mechanism support structure, connected to one of the four support arms. Two of the three gears may be of the same size, and the third may be half the size of the first two gears. This may enable the one of the four support arms having the smaller gear to fold smoothly at twice the speed of the other two support arms so that, when it is in the folded position, all four support arms may be generally parallel and aligned with each other. This may reduce the size of the cart when folded. The folding mechanism may also include a locking plate and bolt that may improve the stability and structural integrity of the cart. The locking plate may be integrated with one of the three gears and may have a slot for the bolt to enter into when locked. The locking plate may be in one of two configurations: locked, when the bolt is engaged into the plate, or unlocked, when the bolt has been removed from the plate. When in the locked position, the locking plate may securely prevent the gears from rotating about their axes. This may maintain a high degree of stability of the cart when in its unfolded operational mode. When the locking plate is in the unlocked position, the gears attached to each of the support arms may be free to rotate said arms to bring the cart into its folded position. In some embodiments, the locking plate may be made of a strong metal such as steel, titanium, tungsten, chromium, iron or another strong metal. In other embodiments the locking plate may be made of a carbon fiber material.

The handle of the cart may be designed using any one of many techniques known to the art such that a user may place their hands on the handle and push the cart. The handle may connect to the upper portion of the cart and to one of the multitude of structural support arms on each side. In some embodiments, a portion of the handle where the user places their hands may be made of a material that is resistant to viral or bacterial growth including, but not limited to: copper; salt; compressed salt; silver; one or more antimicrobial nanomaterials including organic and inorganic nanoparticles such as aluminum oxide nanoparticles (NPs), antimony trioxide NPs, bismuth oxide NPs, calcium oxide NPs, cerium oxide NPs, cobalt oxide NPs, copper oxide NPs, magnetite NPs, iron oxide NPs, magnesium oxide NPs, titanium dioxide NPs, zinc oxide NPs, zinc/iron oxide composite NPs, ZnO-loaded PA6 nanocomposite, graphene oxide, nanosilver decorated TiO2 nanofibres, hybrid CH-a-$Fe_2O_3$ nanocomposite, zinc-doped CuO nanocomposite, PEI-capped ZnO NPs, chitosan-based ZnO NPs, carvone functionalized iron oxide, silver-decorated titanium dioxide, graphene oxide modified ZnO NPs, any number of other metal oxide NPs, and any other NP known to the art; an antimicrobial polymer such as chitosan, heparin, c-Polylysine, or another such polymer; an antimicrobial plastic; an antimicrobial ceramic; or another antimicrobial or antiviral surface known in the art. In some embodiments, the handle of the cart may include one or more buttons that enable the cart to fold by releasing the locking mechanism (moving the locking plate from its locked to its unlocked position). By pulling on cables connected to the locking bolt, these cables may pull the locking bolt up and out of the locking slot plate. In some embodiments, these cables may be hidden inside the structural support arms. In an alternative embodiment, the two buttons may be pushed in a direction parallel to the handle bar but opposite to each other to release the locking bolt.

The two lower support arms on each side of the cart may connect to two wheels on each side of the cart. In some embodiments, the rear wheels may be larger than the front wheels. Said wheels may resemble any number of wheel designs and configurations known in the art.

In some embodiments, the upper handle portion of the cart may include one or more attachments to improve the shopping experience. For example, the handle may include a mobile phone holder and charger. As another example, the handle may include a magnifying glass to help with reading ingredients of shopping products. As a third example, the handle may include a cup or mug holder.

Reference will now be made in detail to exemplary embodiments of the present disclosure, examples of which are illustrated in the accompanying drawings. Wherever possible, the same reference numbers will be used throughout the drawings to refer to the same or like parts or components.

Referring to FIG. 1, a cart 100 according to the present disclosure may include a handle 102, a pair of rear upper support arms 104, a pair of front upper support arms 106, a pair of rear lower support arms 108, and a pair of front lower support arms 110. The handle 102 may be configured to be grabbed by a user's hands and may be sufficiently resilient to withstand a pushing force applied by the user. The handle 102 may be attached to, or integrated with, the pair of rear upper support arms 104. The pair of front lower support arms 110 may be connected by a front cross member 126 for added stability. The pair of rear lower support arms 108 may similarly be connected by a rear cross member 138.

The pair of rear upper support arms 104 may be oriented in parallel to one another. Similarly, the pair of front upper support arms 106 may be oriented in parallel to one another, the pair of rear lower support arms 108 may be oriented in parallel to one another, and the pair of front lower support arms 110 may be oriented in parallel to one another. Further, the rear upper support arms 104 may be oriented in parallel or collinearly with the front lower support arms 110. The front upper support arms 106 may be oriented in parallel or collinearly with the rear lower support arms 108. Front upper support arms 106 may be offset from rear upper support arms 104. For example, a given front upper support arm 106 may form a "V-shape" or similar with a given rear upper support arm 104 on a same lateral side of cart 100. Front lower support arms 110 may be offset from rear lower support arms 108. A given front lower support arm 110 may form an "A-shape" or similar with a given rear lower support arm 108 on a same lateral side of cart 100. Furthermore, the totality of the support arms from a given lateral side of cart 100 (104, 106, 108, and 110) may generally make an "X-shape".

The cart 100 may further include a weight bearing rod 136 extending between a first lateral side and a second lateral side of the cart 100 for added stability. The weight bearing rod 136 may be attached on the first lateral side at an intersection and/or pivot point of the rear upper support arm 104, the front upper support arm 106, the rear lower support arm 108, and the front lower support arm 110 on the first lateral side. The weight bearing rod 136 may similarly be attached on the second lateral side at an intersection and/or pivot point of the rear upper support arm 104, the front upper support arm 106, the rear lower support arm 108, and the front lower support arm 110 on the second lateral side.

The cart 100 may further include a holding frame 112 supported by the rear upper support arms 104 and the front upper support arms 106. The holding frame 112 may be pivotally attached to the rear upper support arms 104 and the front upper support arms 106 in any suitable manner, such as by bolts or other fasteners. The holding frame 112 may be configured to support detachable compartments, containers, or bags for holding merchandise or groceries. The holding frame 112 may include a cross beam 114 which may serve to add structural support to the holding frame 112 and may further serve to provide a means for supporting containers or bags. The cross beam 114 may extend from one lateral side of the holding frame 112 to an opposite lateral side of the holding frame 112. The holding frame 112 may further include a frame folding mechanism 124, such as a hinge or the like, on each lateral side of the holding frame 112, which may allow the holding frame 112 to fold during folding of the cart 100. The frame folding mechanism 124 may be positioned at respective ends of the cross beam 114.

The rear lower support arms 108 and front lower support arms 110 may support the rear upper support arms 104 and front upper support arms 106. Each of the rear lower support arms 108 may be adapted to attach to a rear wheel 118. Each of the front lower support arms 110 may be adapted to attach to a front wheel 120. In some embodiments, the rear wheels 118 may be larger than the front wheels 120. In some embodiments, the rear wheels 118 may be smaller than the front wheels 120. In some embodiments, the rear wheels 118 and the front wheels 120 may be the same size. Either or both of the rear wheels 118 or front wheels 120 may be caster wheels that are capable of rotating about a vertical axis in addition to rotating about a rolling axis. During use of the cart 100, the cart 100 may roll about the rear wheels 118 and the front wheels 120. The rear lower support arms 108 and front lower support arms 110 may further be connected to the rear upper support arms 104 and front upper support arms 106 via a pair of folding mechanisms 122. The folding mechanisms 122 may be configured to allow the cart 100 to collapse or fold into a folded position for convenient transport or space saving. The folding mechanisms 122 may generally be located at the ends of the weight bearing rod 136, at the intersection of the rear upper support arm 104, front upper support arm 106, rear lower support arms 108, and front lower support arm 110 and each lateral side of the cart 100. The folding mechanisms 122 will be described hereinafter in greater detail.

The cart 100 may further include a platform 116. The platform 116 may be configured as a grate with a plurality of slats, as shown in FIG. 1, or may alternatively be configured as a flat plate. The platform 116 may further include a folding hinge 134 which may allow the platform 116 to fold. The platform 116 may further include a spring mechanism (not shown) that may assist in folding of the platform 116. The platform 116 may be pivotally supported by each of the rear lower support arms 108 and front lower support arms 110. The platform 116 may incorporate rounded indentations to accommodate bottles and other objects susceptible to rolling. The platform 116 may further be supported at a height above the rear wheels 118 and front wheels 120. The platform 116 may strengthen and stiffen the cart 100 during use, and reduce the likelihood of accidental folding of the cart 100.

Though not depicted in FIG. 1, the cart 100 may further include an accessory attachment system. The accessory attachment system may include one or more of a mobile phone holder, a mobile phone charger, a magnifying glass to help with reading ingredients of shopping products, or a cup or mug holder.

Figure 2:
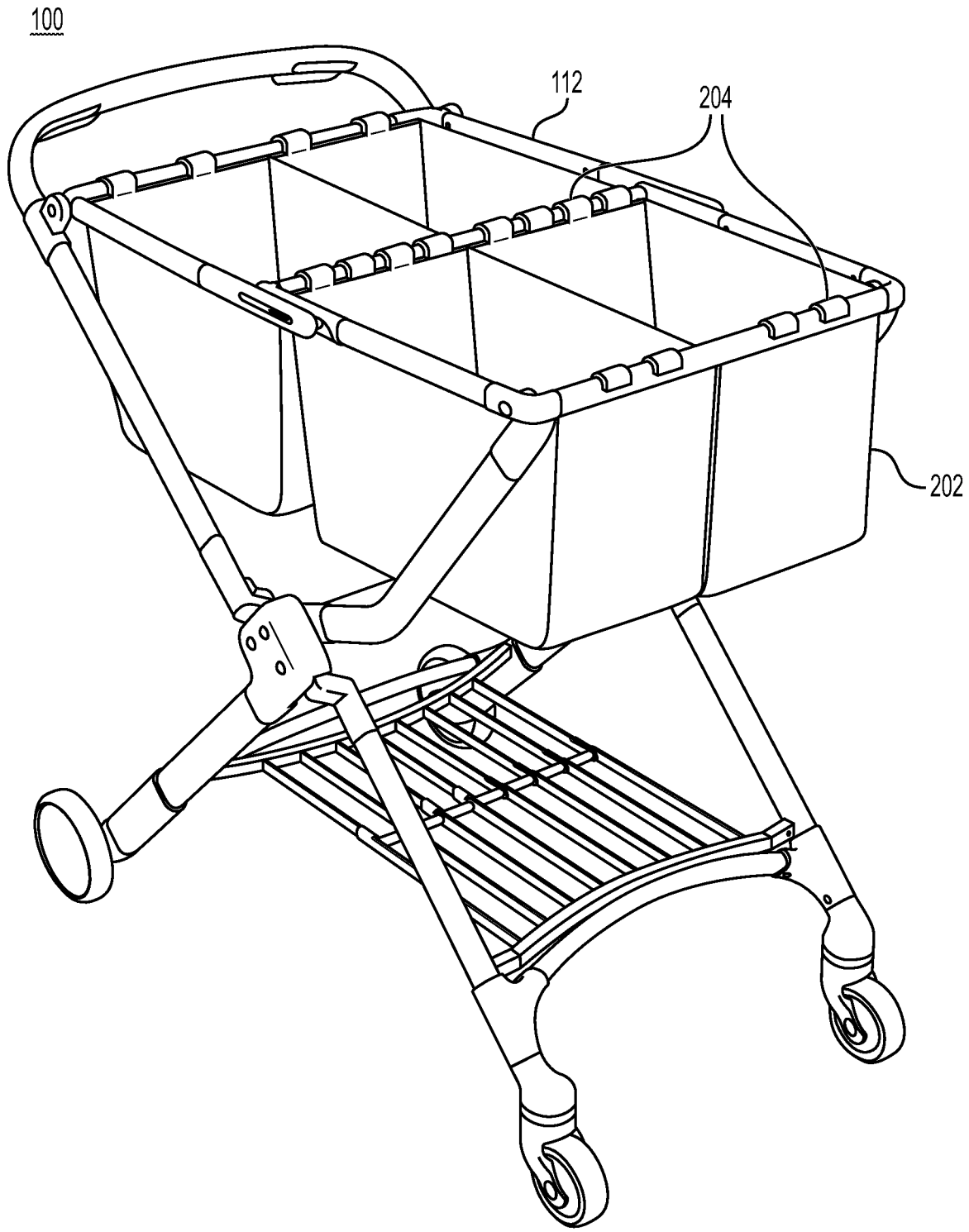
FIG. 2 depicts an isometric view of a cart in an unfolded position with bags according to some embodiments.
Figure 3:
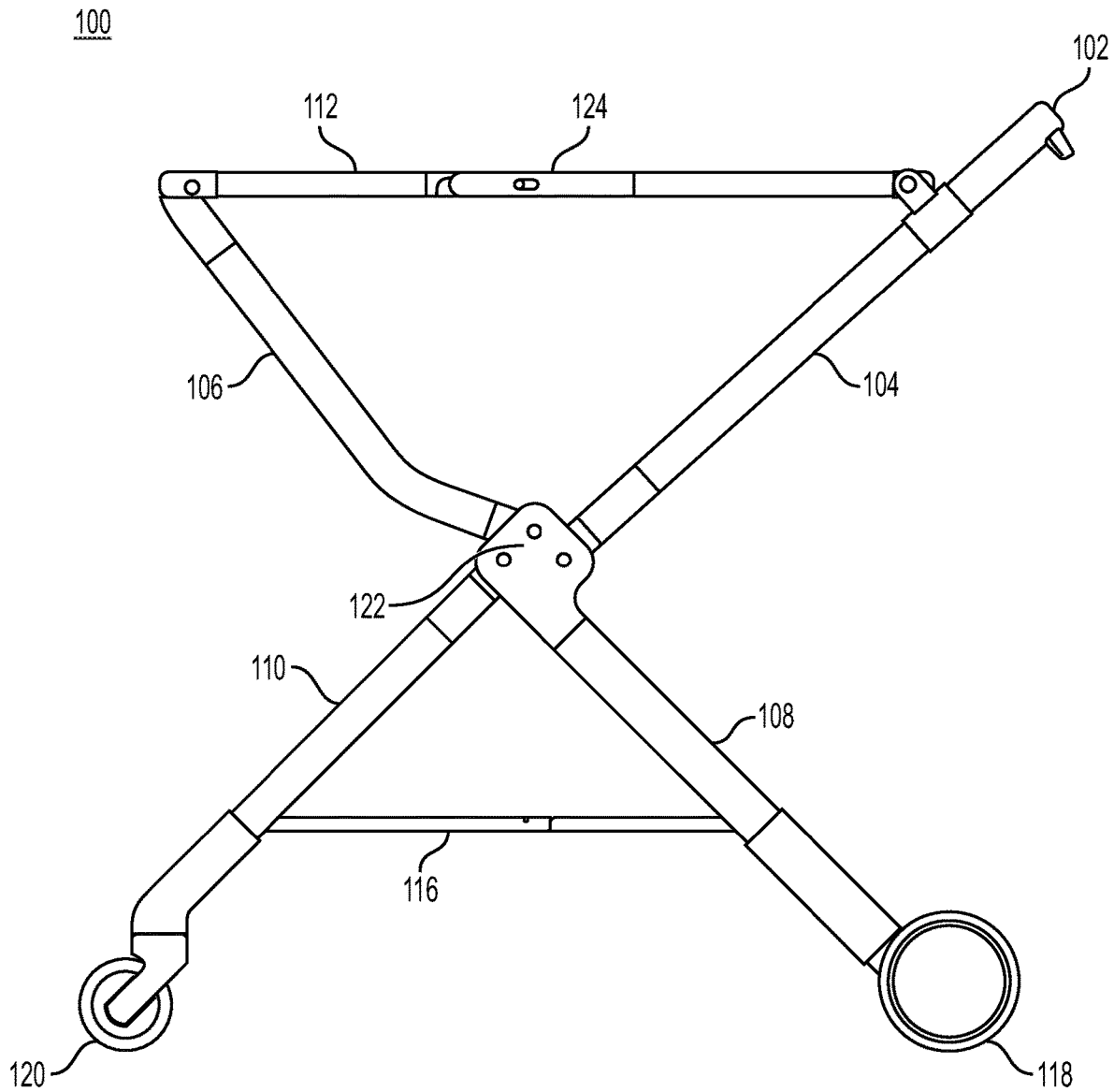
FIG. 3 depicts a side view of a cart in an unfolded position without bags according to some embodiments.
Figure 4:
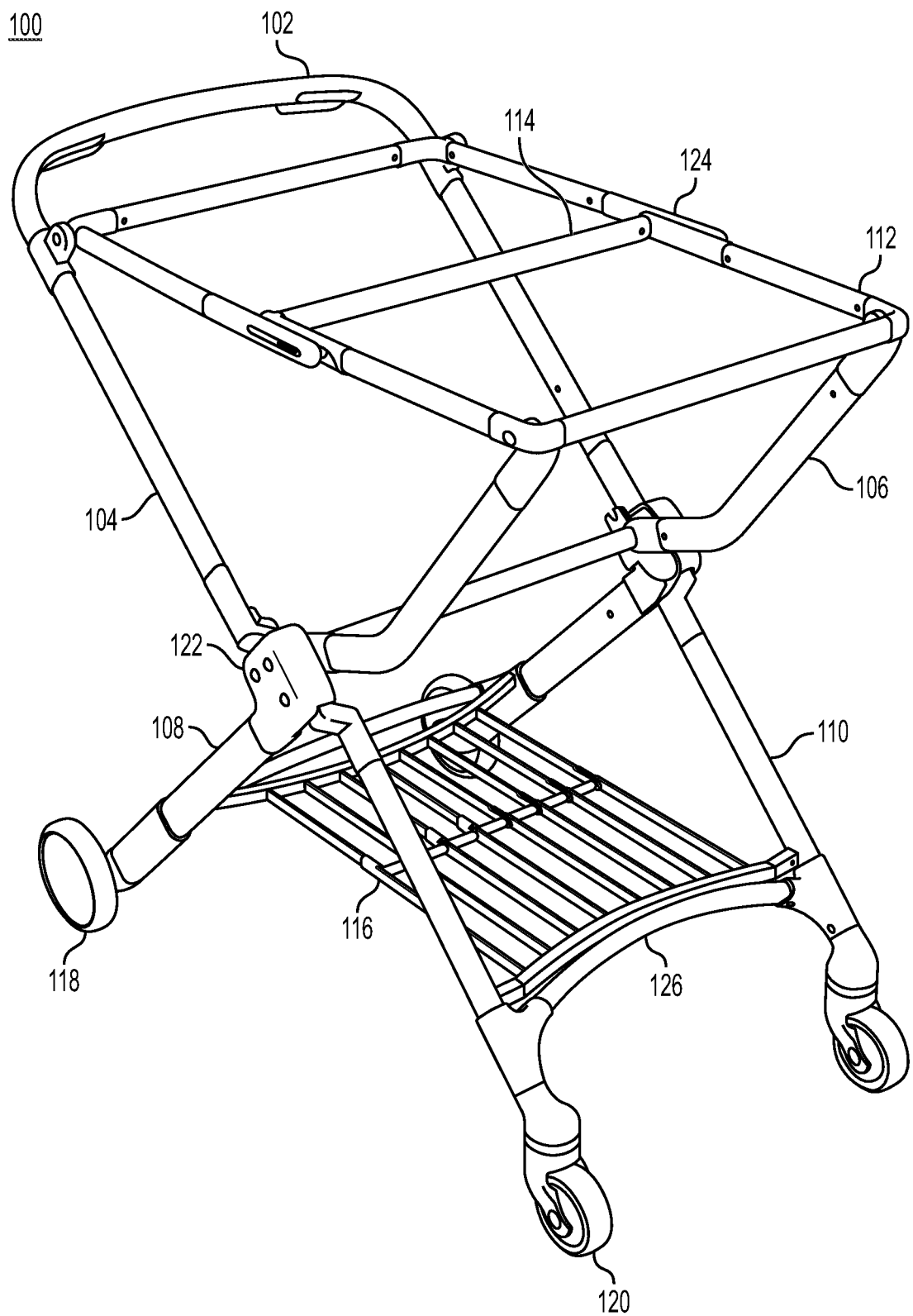
FIG. 4 depicts an isometric view of a cart in an unfolded position without bags according to some embodiments.
Figure 5A:
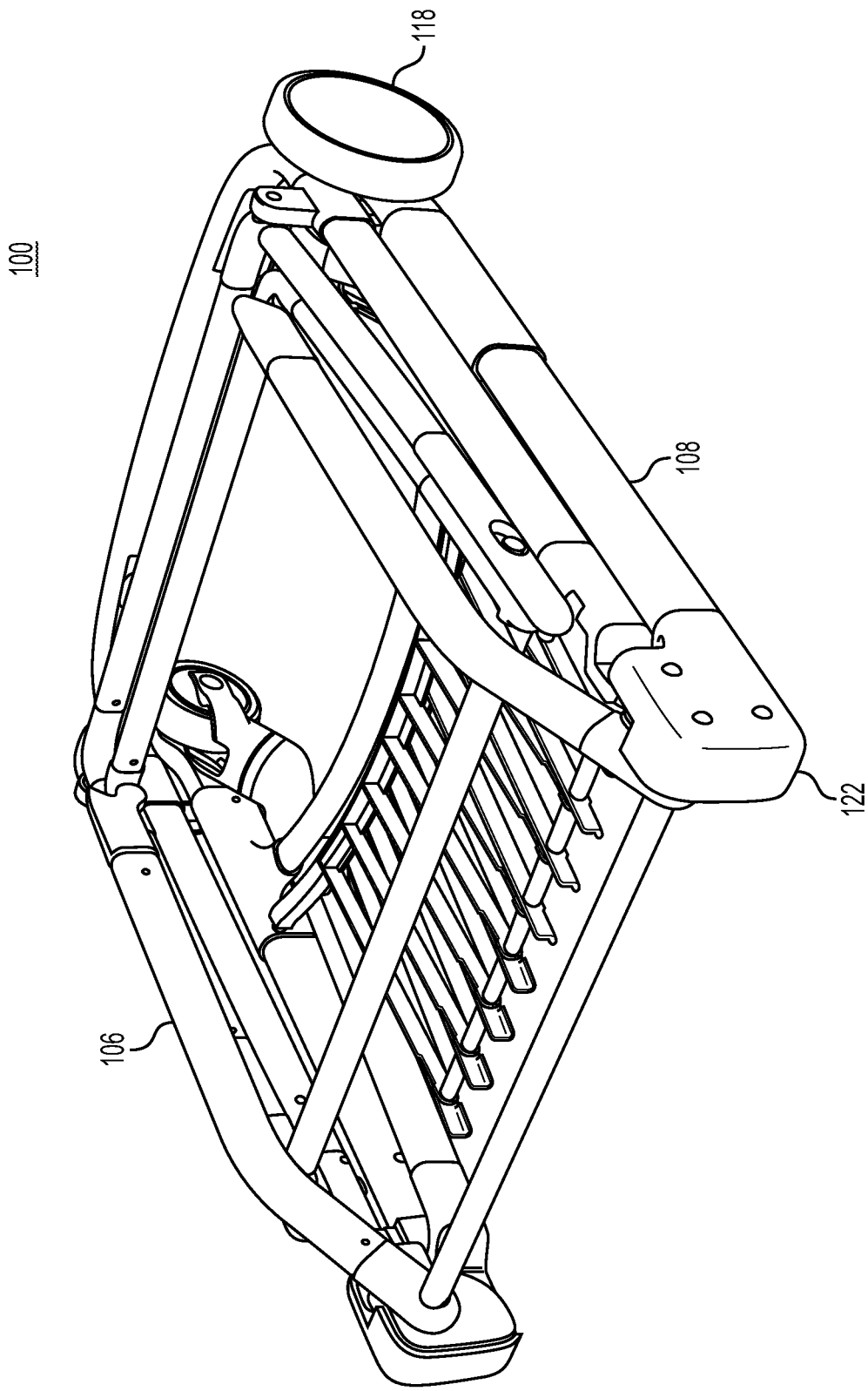
FIG. 5A depicts an isometric view of a cart in its folded position according to some embodiments.
Figure 5B:
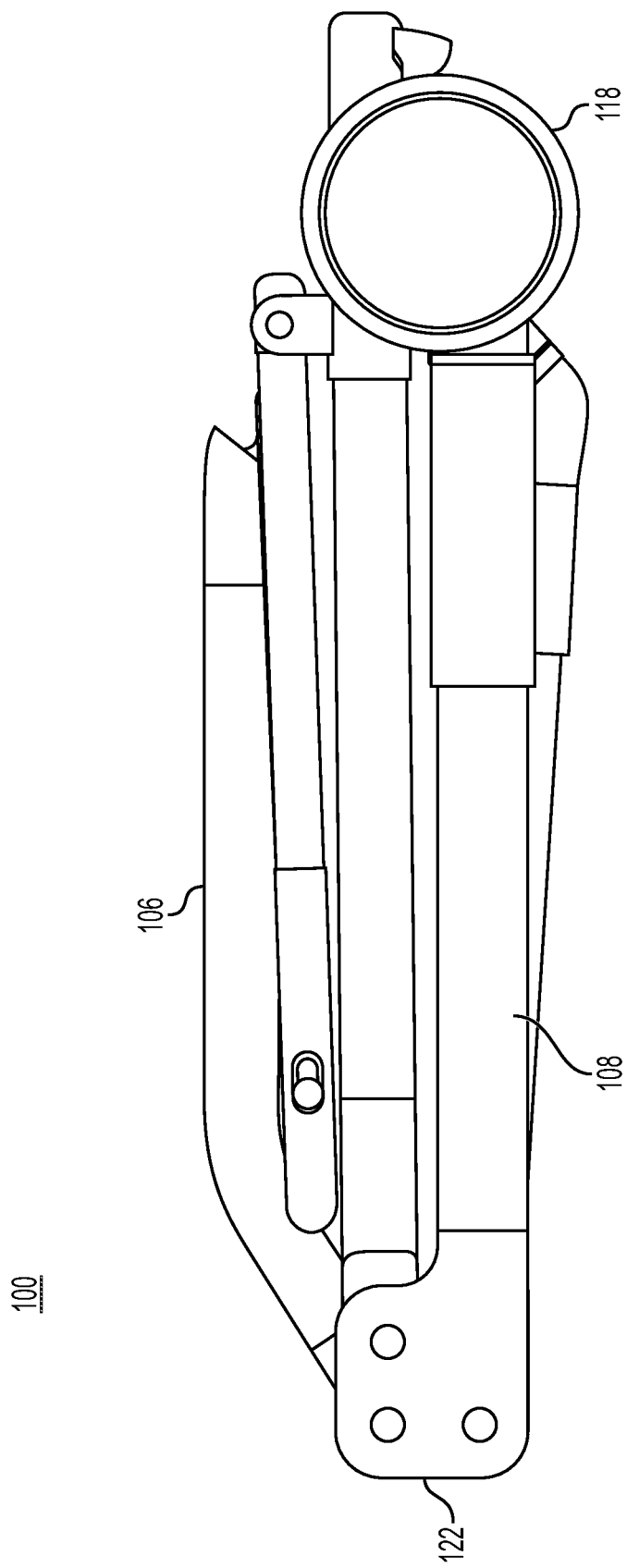
FIG. 5B depicts a side view of a cart in its folded position according to some embodiments.
Figure 5C:
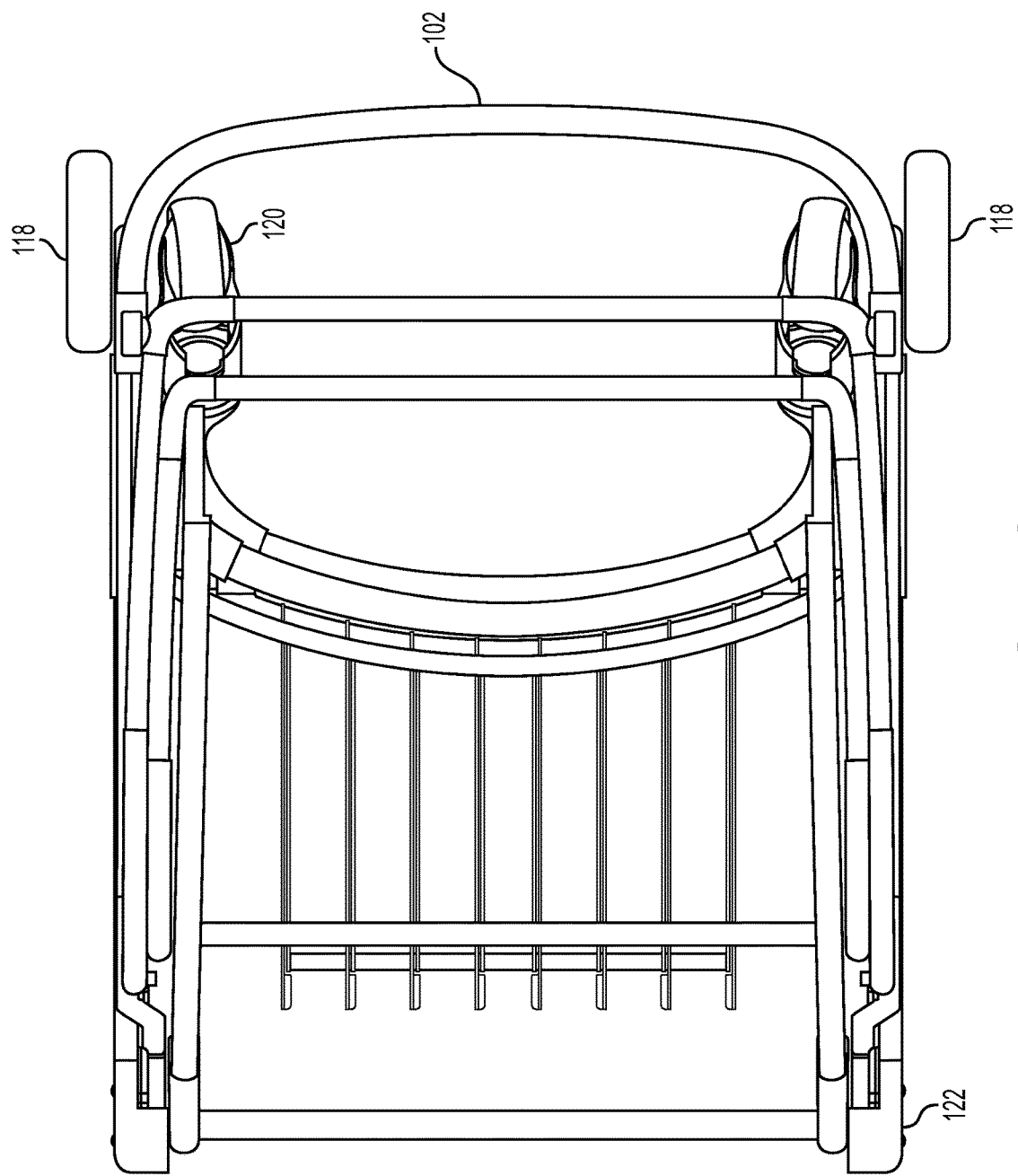
FIG. 5C depicts a top view of a cart in its folded position according to some embodiments.
Figure 5D:
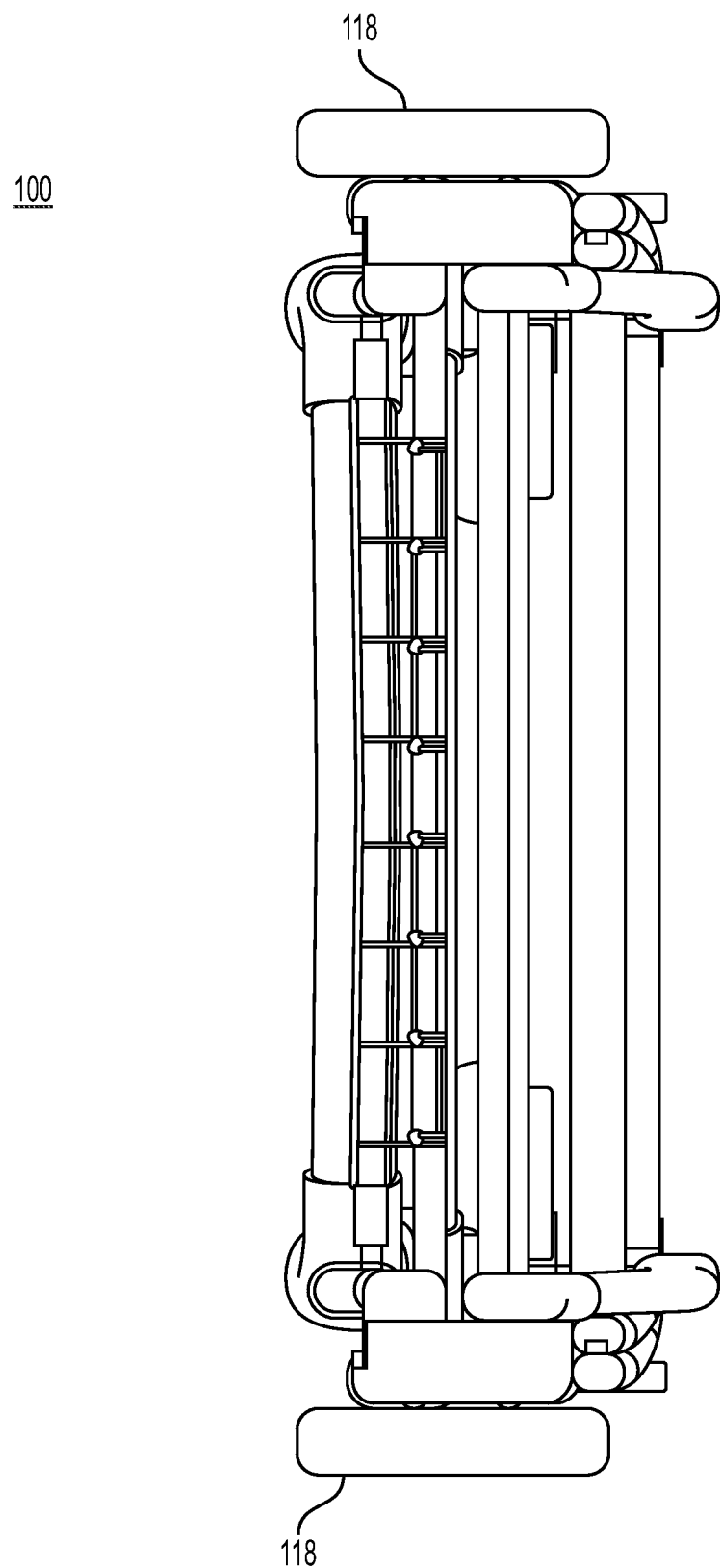
FIG. 5D depicts a front view of a cart in its folded position according to some embodiments.

Referring to FIG. 2, the cart 100 may be configured to support one or more bags 202. The one or more bags 202 may be supported by the holding frame 112. In some embodiments, the one or more bags 202 may include clips 204 positioned along upper edges of the one or more bags 202 and configured to clip onto the holding frame 112. The clips 204 may thereby suspend the one or more bags 202 from the holding frame 112. The one or more bags 202 may be constructed from any suitable material such as canvas, mesh, plastic, hemp, vinyl, burlap, nylon, polyester, recycled PET, insulated material, or any other material used in the construction of bags. The one or more bags 202 may further be configured to accommodate, or otherwise may include, an assortment of smaller, easily removable bags. Each of the smaller bags may be adapted to hold a specific type of product, such as produce, for example. The smaller bags may include, for example, one or more small insulated bags and one or more mesh bags. The one or more mesh bags may be, for example, closeable with a drawstring. The smaller bags may be attachable to an inner side of a bag 202.

The cart 100 may be configured to support any number of bags. In some embodiments, as shown in FIG. 2, the cart 100 may be configured to support four bags 202. The bags 202, when loaded into the cart 100, may be arranged in a two-by-two arrangement, for example, with two bags 202 supported toward a front end of the cart 100 and two bags 202 supported toward a rear end of the cart 100. In some embodiments, the bags 202 may be arranged linearly, either in a front-to-back formation, or a lateral formation.

Referring to FIGS. 5A-D, the cart 100 may be folded into a compact configuration for convenient transport and/or storage. Each of the rear upper support arms 104, front upper support arms 106, and front lower support arms 110 may rotate about the folding mechanisms 122, relative to the rear lower support arms 108, on either side of the cart 100. When in a folded position, the rear upper support arms 104, front upper support arms 106, rear lower support arms 108, and front lower support arms 110 on either side of the cart 100 may be oriented in parallel for maximum space saving. Furthermore, front wheels 120 may nest beside and laterally inside rear wheels 118 when the cart 100 is in a folded position. When the cart 100 is in a folded position, the front wheels 120 and the rear wheels 118 may be positioned near handle 102. Handle 102 and/or the weight bearing rod 136 may be positioned such that they may be used to carry the cart 100 when in the folded position.

Figure 6A:
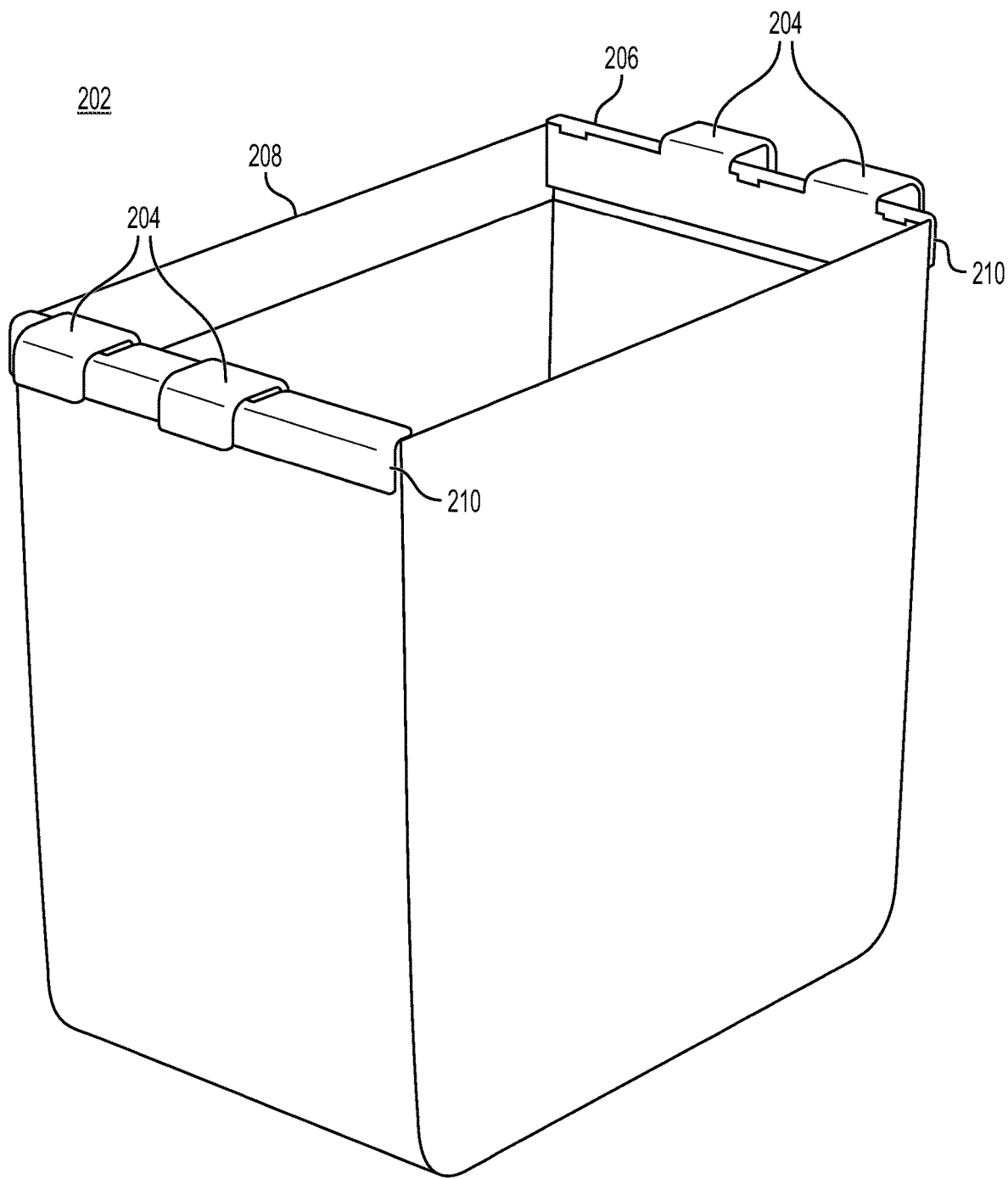
FIG. 6A depicts an isometric view of a bag that may attach to a cart according to some embodiments.
Figure 6B:
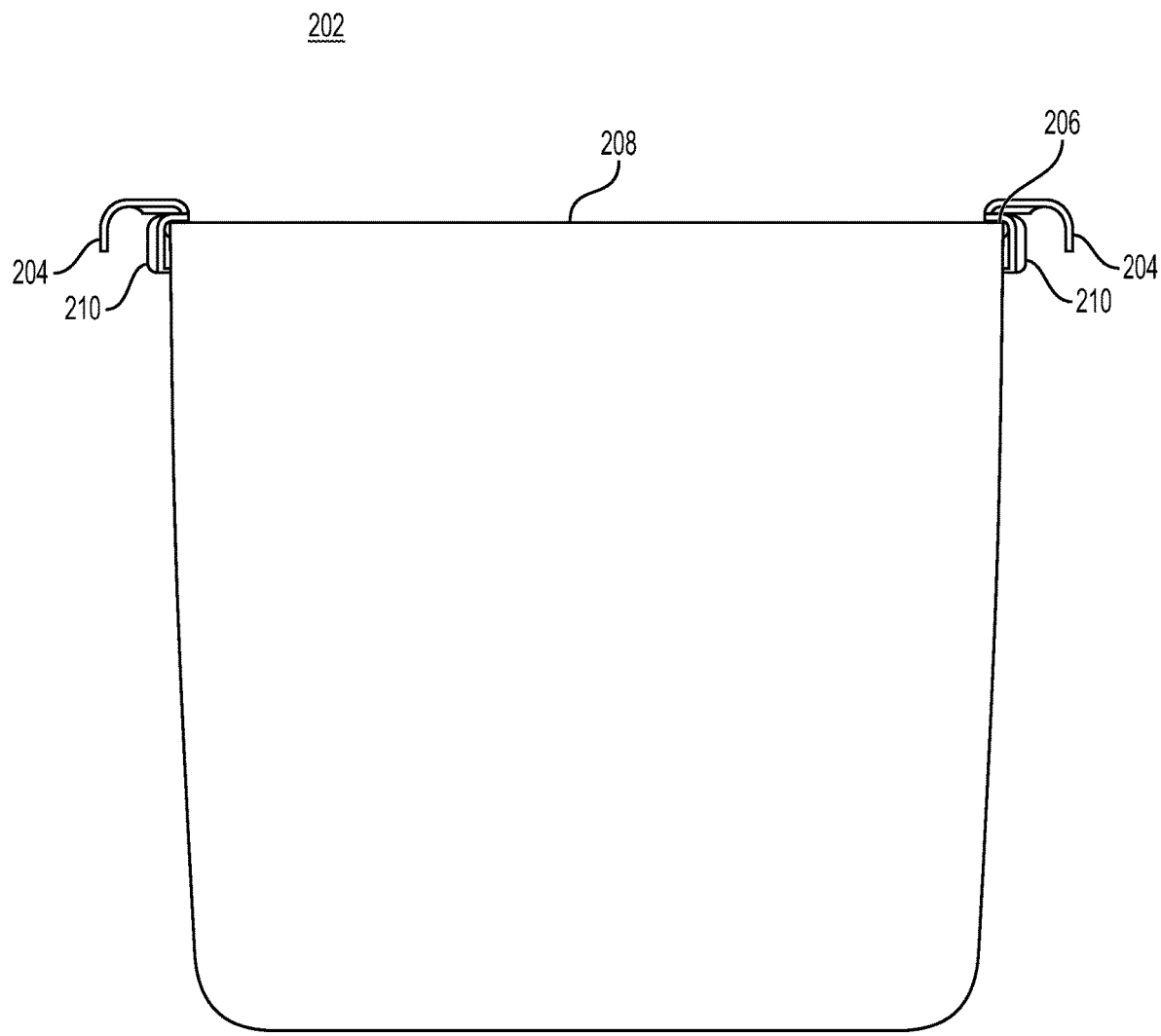
FIG. 6B depicts a side view of a bag that may attach to a cart according to some embodiments.

FIGS. 6A and 6B depict a bag 202. The bag 202 may be shaped generally as a rectangular prism. The bag 202 may include a pair of first top edges 206 and a pair of second top edges 208. In some embodiments, the second top edges 208 may be longer than the first top edges 206. Clip members 210 may be attached to bag 202 along the first top edges 206. Clip members 210 may also be attached to bag 202 along the second top edges 208. The clip members 210 may include one or more clips 204 which are configured to clip onto the holding frame 112 and/or the cross beam 114 of the cart 100. The one or more clips 204 along one of the first top edges 206 of the bag 202 may be offset from the one or more clips 204 along the opposite first top edge 206. By offsetting the clips 204, a similarly configured bag 202 may simultaneously be clipped to the cross beam 114, as shown in FIG. 2. Alternatively, one or more clips 204 on a first bag 202 may be offset relative to one or more clips 204 on a second bag 202, thereby allowing the first bag 202 and the second bag 202 to be positioned on the cart 100 adjacently and be simultaneously clipped to the cross beam 114.

The bag 202 may be constructed from any suitable material, including canvas, mesh, plastic, hemp, burlap, nylon, vinyl, polyester, recycled PET, an insulated material, or any other material used in the construction of bags.

In some embodiments, the bag 202 may include one or more handles attached thereto. The one or more handles may be attached to the first top edges 206, the second top edges 208, interior surfaces of the bag 202, or exterior surfaces of the bag 202. The one or more handles may be constructed from the same material as the bag 202, or may be constructed from any other material suitable for being held by a user's hands and supporting the weight of the bag 202 and its contents. The one or more handles may be attached to the bag by any suitable attachment means, including stitching, adhesive, rivets, snaps, or any other manner of attachment. When the bag 202 is attached to, or supported by, the cart 100, the one or more handles may fold downward along interior surfaces of the bag 202 or exterior surfaces of the bag 202. If a user wishes to remove the bag 202 from the cart 100, the user may locate the one or more handles, grasp the one or more handles, and lift the bag 202 by the one or more handles generally vertically from the cart 100 to disengage the clips 204 from the holding frame 112 and/or the cross beam 114.

In some embodiments, the bag 202 may include a removable lid configured to enclose the top of the bag 202. The removable lid may be integrated into any one of the first top edges 206, second top edges 208, or clip members 210. The removable lid may be attached to the bag 202 via a hinge such that it swings open upwardly to allow access to contents of the bag 202. The removable lid may further be constructed from an insulating material to insulate contents of the bag 202.

Figure 7A:
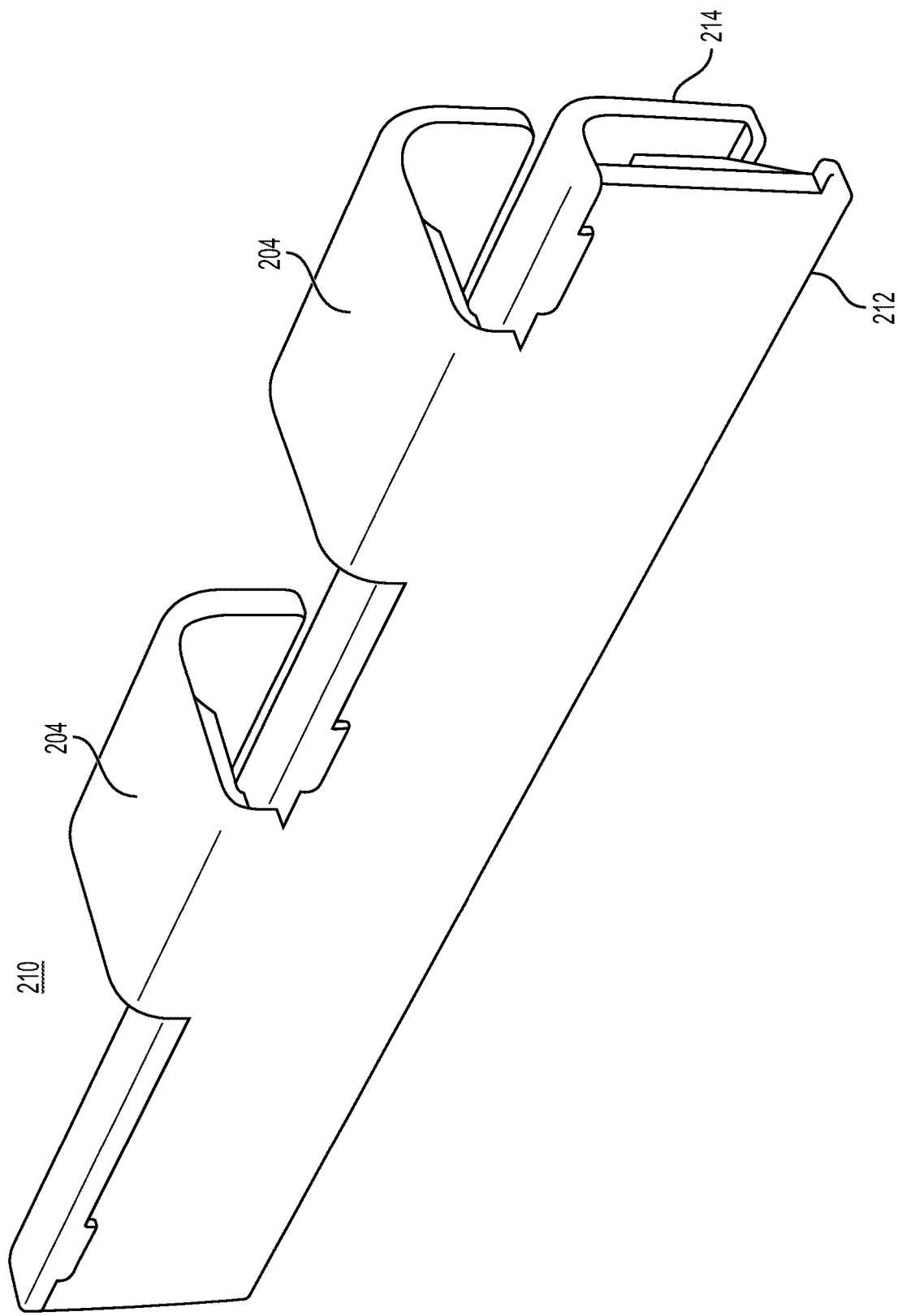
FIG. 7A depicts an isometric view of a clip member according to some embodiments.
Figure 7B:
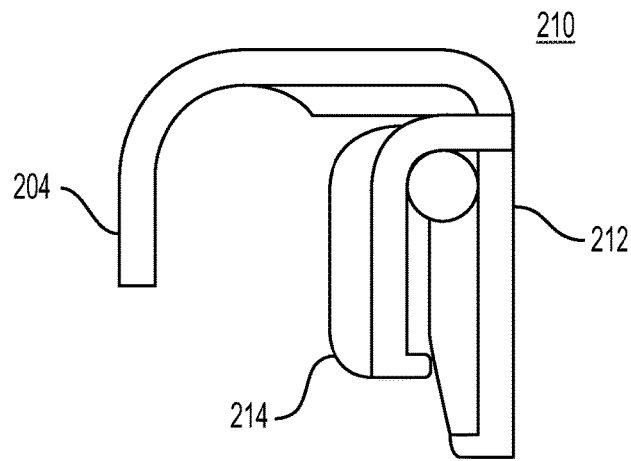
FIG. 7B depicts a side view of a clip member according to some embodiments.

Referring to FIGS. 7A and 7B, the clip member 210 is shown in greater detail. The clip members 210 may include one or more clips 204 for attaching to the holding frame 112 and/or cross beam 114. The clips 204 may be shaped according to a cross section of the holding frame 112 and/or cross beam 114. For example, in some embodiments, the clips 204 may be shaped to attach to the holding frame 112 and/or cross beam 114 having a circular cross section. The clips 204 may be configured to be removably attached to the holding frame 112 and/or cross beam 114 by, for example, resting thereon. Alternatively, the clips 204 may be snap fit to the holding frame 112 and/or cross beam 114. The clips 204 may be arranged on the clip member 210 asymmetrically and may be spaced apart from each other by a distance which is at least the width of a clip 204. In this way, two or more clip members 210 may be oriented on opposite sides of, attached to, the cross beam 114 with clips 204 interleaved.

The clip member 210 may include inner flange 212 and an outer flange 214. The inner flange 212 and outer flange 214 may be biased toward each other by a spring mechanism. The clip member 210 may be attached to the bag 202 such that an upper portion of the bag 202 is held between the inner flange 212 and the outer flange 214. The clip member 210 may be attached to the bag 202 in any manner suitable for supporting the weight of items placed therein, including by hooks, a hook and loop system such as Velcro, adhesive, glue, etc. In some embodiments, the clip member 210 may be able to support at least 10 pounds in each bag 202. In some embodiments, the clip member 210 may be able to support at least 25 pounds in each bag 202. In some embodiments, the clip member 210 may be able to support at least 50 pounds in each bag 202. In some embodiments, the clip member 210 may be able to support at least 100 pounds in each bag 202. In some embodiments, the clip member 210 may be removably attached to the bag 202 such that in use, the clip member 210 attaches to the bag by friction.

Figure 8A:
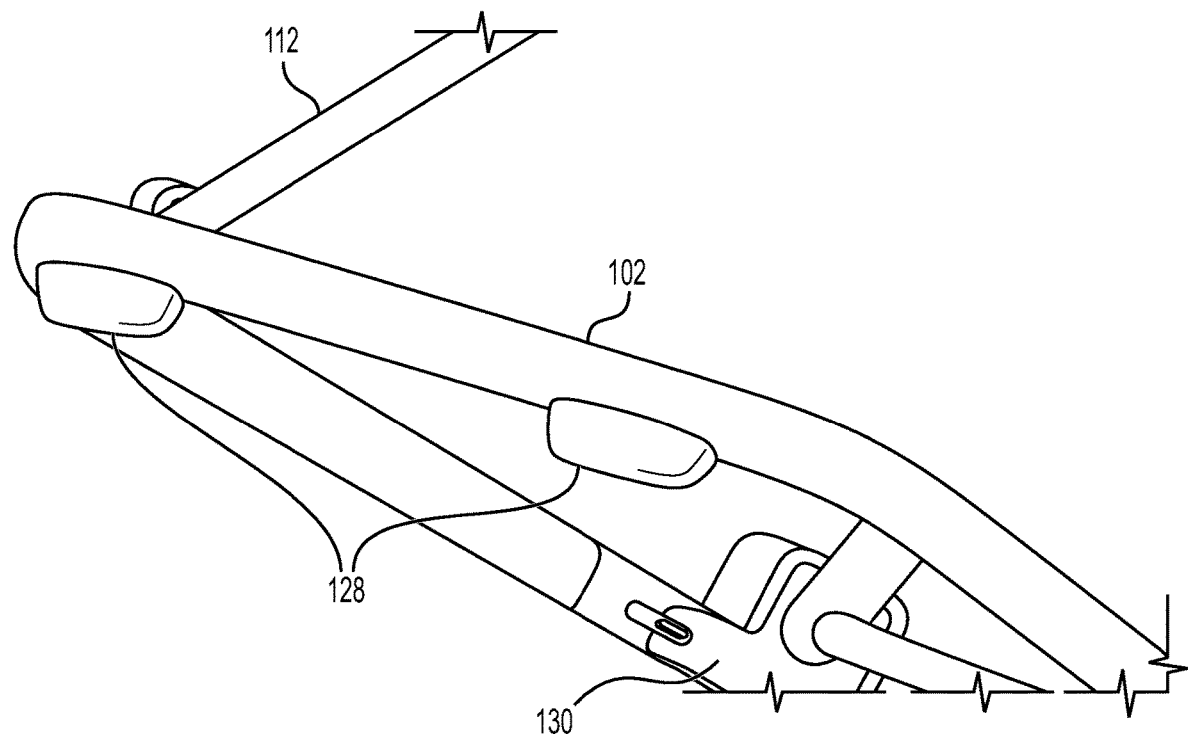
FIG. 8A depicts an isometric view of a handle, buttons, and a locking mechanism according to some embodiments.
Figure 8B:
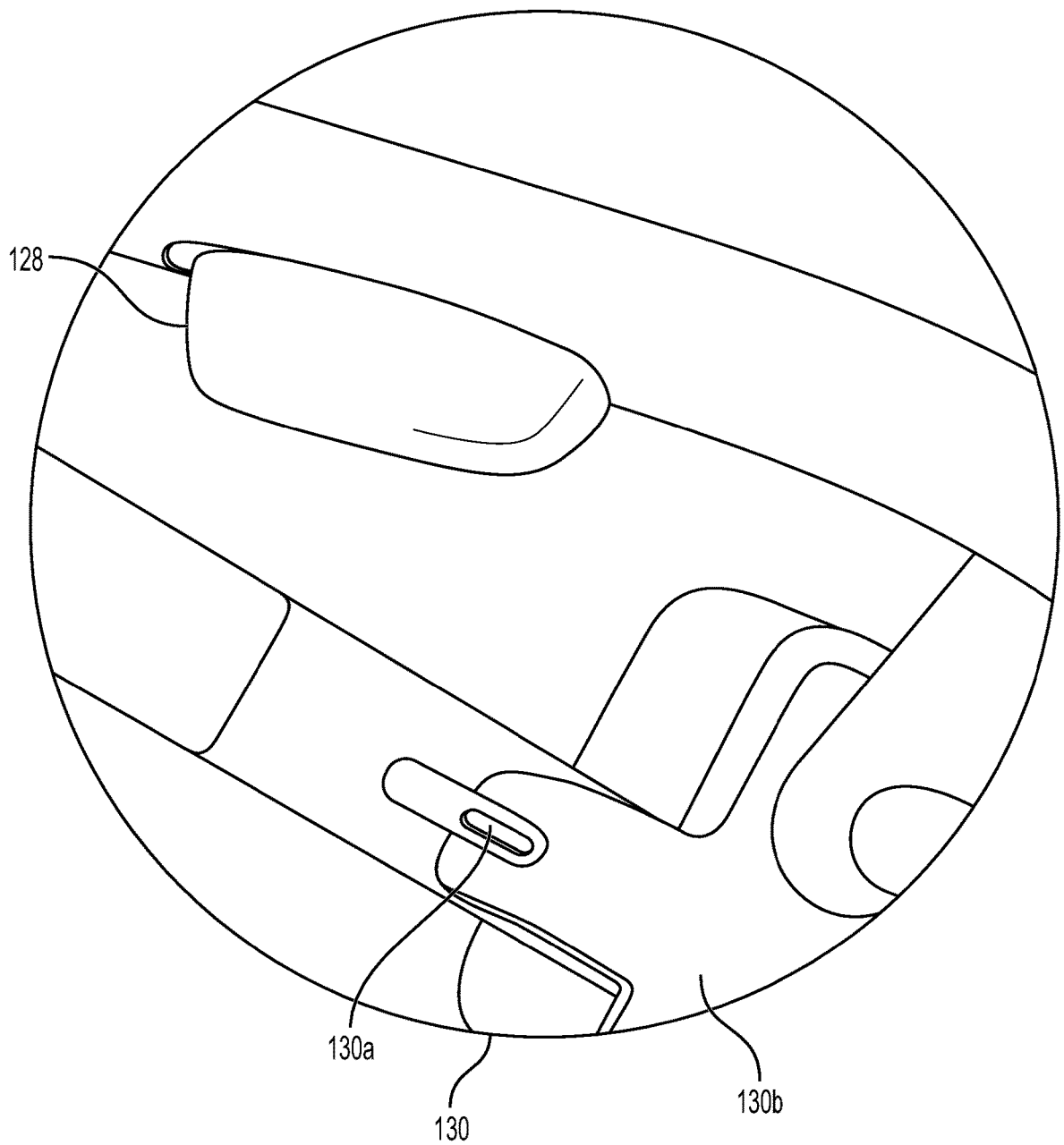
FIG. 8B depicts a close-up isometric view of buttons and a locking mechanism according to some embodiments.

Referring to FIGS. 8A and 8B, the cart 100 may include one or more buttons 128 for operating a locking mechanism 130. The one or more buttons 128 may be located on the handle 102. In some embodiments, the one or more buttons 128 may be oriented on a side of the handle 102 near a user for convenient operation by the user. In some embodiments, the one or more buttons 128 may be oriented on any of the rear upper support arms 104, front upper support arms 106, rear lower support arms 108, front lower support arms 110, or holding frame 112. The one or more buttons 128 may be operably coupled to the locking mechanism 130 via a cable that runs within the handle 102 and within the rear upper support arms 104.

The locking mechanism 130 may include a locking bolt 130a and a locking plate 130b. The locking plate 130b may be fixed to either of the rear lower support arms 108 or front lower support arms 110 and may further include a slot configured to accept the locking bolt 130a. The locking bolt 130a may be positioned on either of the rear upper support arms 104 or front upper support arms 106. When the locking bolt 130a is positioned so as to extend through the slot of locking plate 130b, the locking mechanism 130 may prevent the arms on which the locking bolt 130a is attached from rotating relative to the arms to which the locking plate 130b is coupled. Due to a configuration of the folding mechanisms 122, which will be described in greater detail hereinafter, the locking mechanism 130 may thereby be in a locked position and prevent the cart 100 from folding.

On the other hand, if a user wishes to convert the cart 100 from an unfolded position to a folded position, the user may push the one or more buttons 128. By pushing the one or more buttons 128, the locking bolt 130a may, due to tension of an internal cable, retract from the slot of locking plate 130b. When the locking bolt 130a retracts from the slot of the locking plate 130b, the locking mechanism 130 may be in an unlocked position and may allow, for example, the rear upper support arms 104 to rotate with respect to the rear lower support arms 108. Due to a configuration of the folding mechanisms 122, the front upper support arms 106 and front lower support arms 110 may also be permitted to rotate relative to the rear lower support arms 108, thereby allowing the cart 100 to fold. In some embodiments, the one or more buttons 128 may be slid sideways to release the locking bolt 130*a*. In some embodiments, two buttons 128 may be required to be pressed or slid to release the locking bolt 130*a*.

Figure 9A:
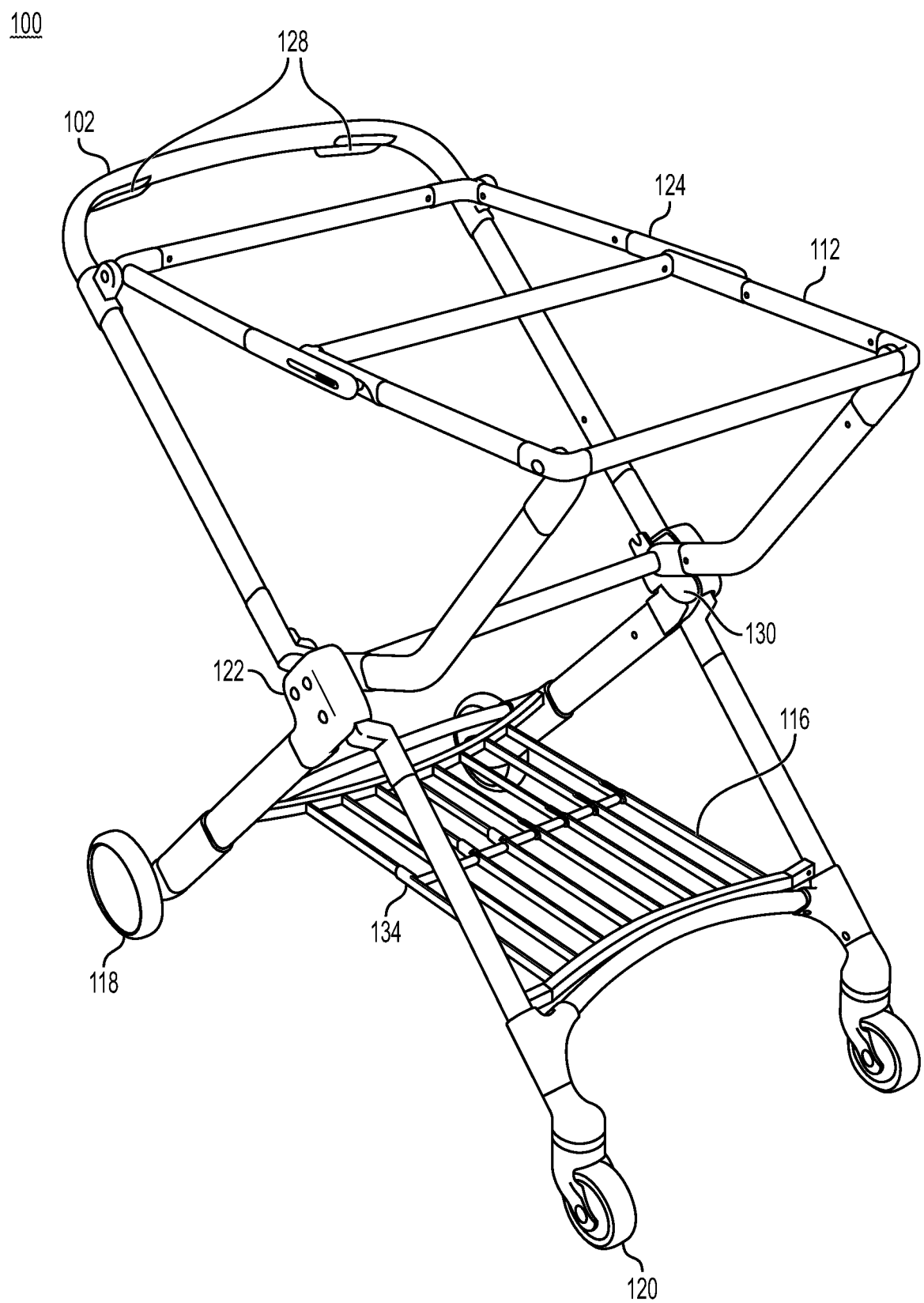
FIG. 9A depicts an isometric view of a cart in an unfolded position without bags according to some embodiments.
Figure 9B:
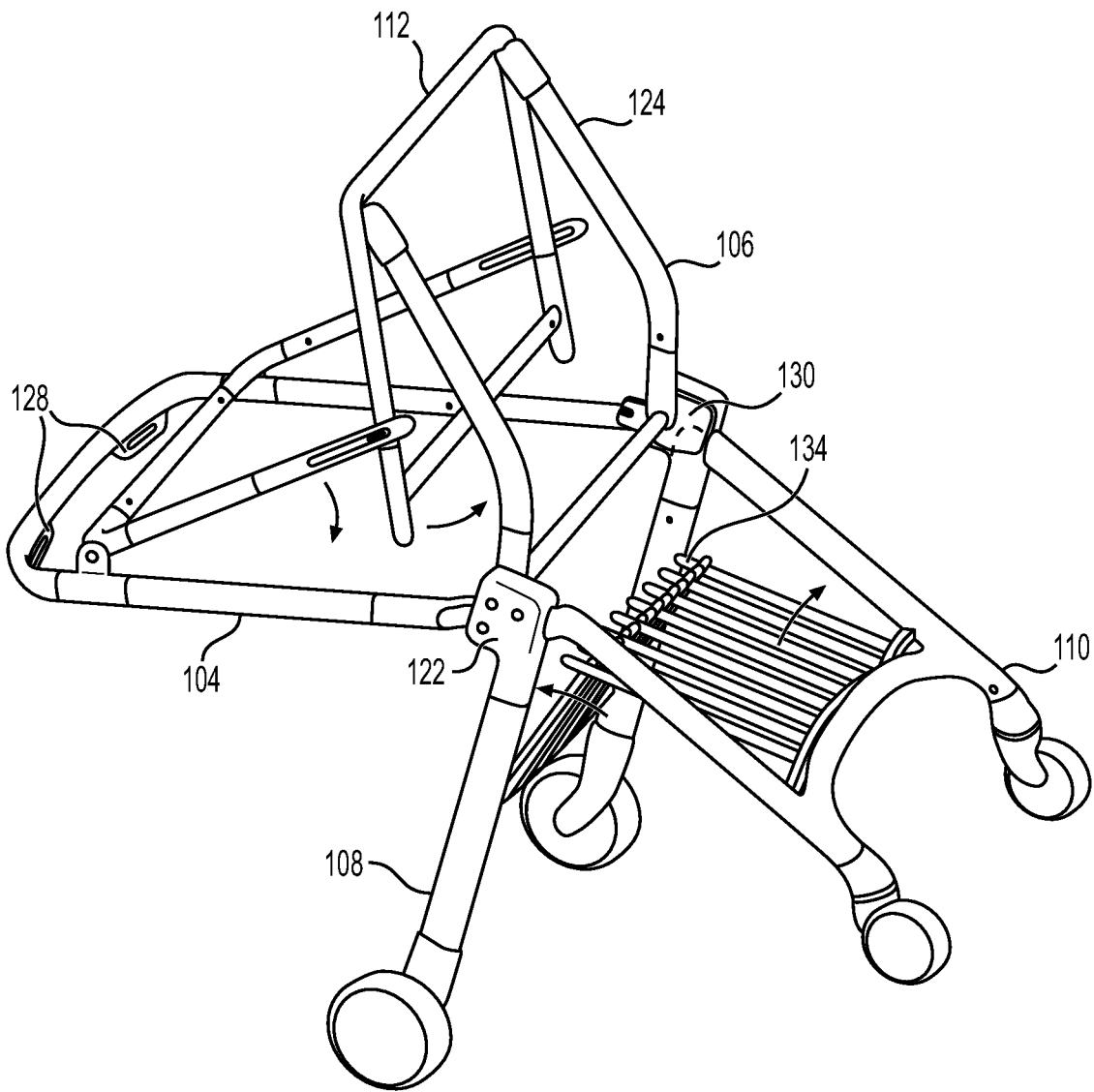
FIG. 9B depicts an isometric view of a cart in a partially folded position according to some embodiments.
Figure 9C:
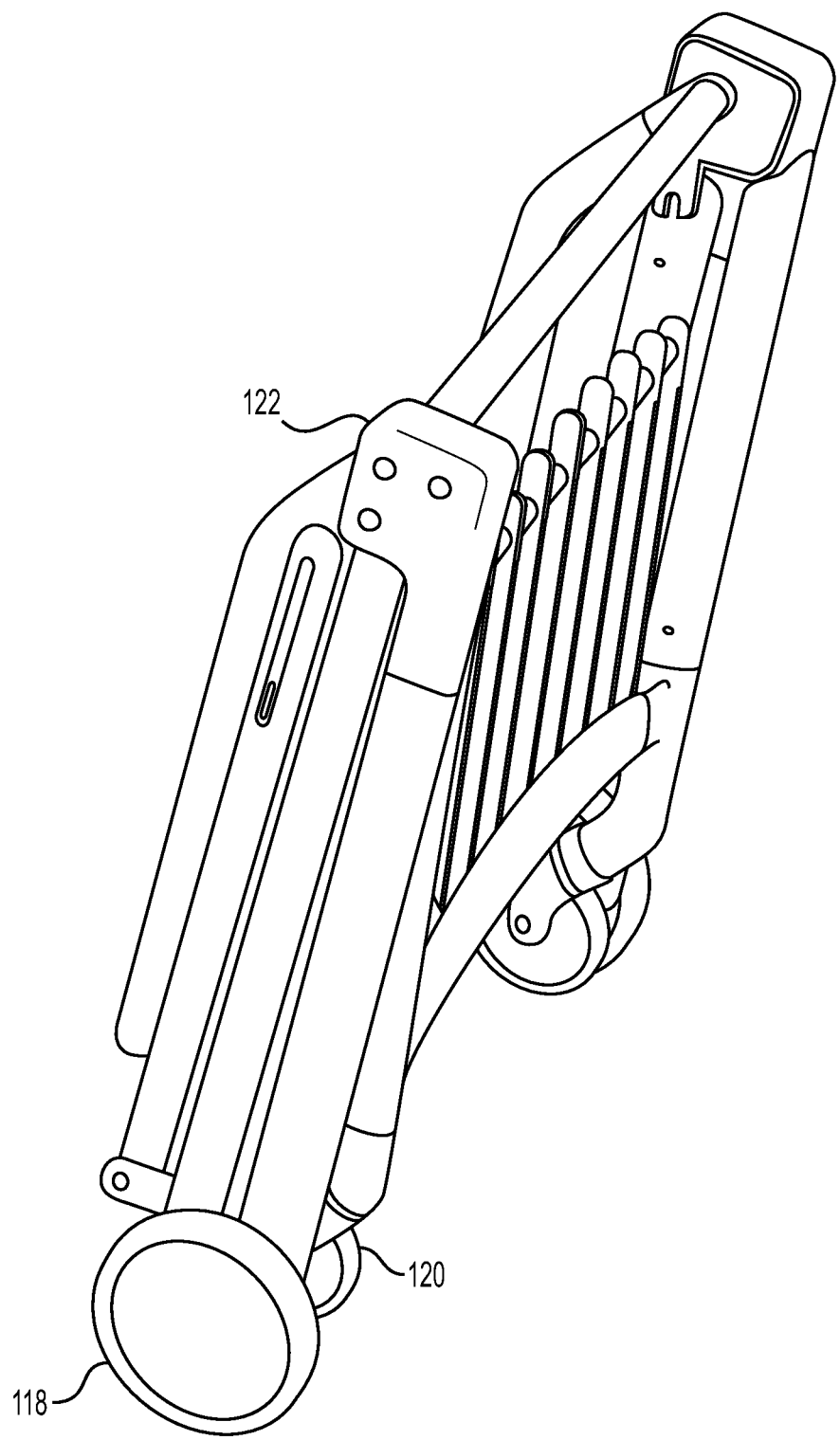
FIG. 9C depicts an isometric view of a cart in a folded position according to some embodiments.

FIGS. 9A-C depict a folding sequence in which a cart 100 may transition from an unfolded position to a folded position, according to some embodiments. As shown in FIG. 9A, the cart 100 may begin the sequence in an unfolded position. In the unfolded position, the locking mechanism 130 may be in a locked position, such that the rear upper support arms 104, the front upper support arms 106 the rear lower support arms 108, and the front lower support arms 110 may be prevented from rotating. The holding frame 112 may be in a fully extended position such that frame folding mechanism 124 is not folded. The platform 116 may likewise be in a fully extended position such that folding hinge 134 is not folded. In the unfolded position, the cart 100 may support one or more bags 202 containing various items.

If a user of a cart 100 wishes to initiate a folding sequence, the user may press the one or more buttons 128. Upon pressing the one or more buttons 128, the locking mechanism 130 may be placed into an unlocked position such that the rear upper support arms 104, the front upper support arms 106, and the front lower support arms 110 are free to rotate with respect to the rear lower support arms 108. As shown in FIG. 9B, the cart 100 may then be placed into a partially folded position by the user. The front upper support arms 106 may rotate about the folding mechanisms 122 toward the rear upper support arms 104. The rear upper support arms 104 may rotate about the folding mechanisms 122 toward the rear lower support arms 108. The front lower support arms 110 may rotate about the folding mechanisms 122 toward the rear lower support arms 108.

Further, the holding frame 112 may fold as shown due to folding of the frame folding mechanism 124. More specifically, the holding frame 112 may include a front portion and a rear portion that rotate toward each other during folding of the cart 100. The front portion and rear portion of the holding frame 112 may be rotatably coupled via one or more pins or bolts, for example. When the cart 100 is in a folded position, the front portion and rear portion of the holding frame 112 may be nested or stacked together. Similarly, the platform 116 may include a front portion and a rear portion that rotate toward each other during folding of the cart 100. The front portion and rear portion of the platform 116 may also be rotatably coupled via one or more pins or bolts, for example. The front portion and rear portion of the platform 116 may further fold about a plurality of central pivot points of the platform 116. When the cart 100 is in a folded position, the front portion and rear portion of the platform 116 may be nested or stacked together. Additionally, the platform 116 may fold as shown due to folding of the folding hinge 134. Folding of the platform 116 may further be driven by a spring mechanism.

As shown in FIG. 9C, the cart 100 may be placed into a folded position upon completion of the folding sequence. In the folding position, each of the rear upper support arms 104, the front upper support arms 106, the rear lower support arms 108, and the front lower support arms 110 may be oriented in parallel. Further, the holding frame 112 and the platform 116 may be situated in between the folded arms. One or more of the rear wheels 118 and front wheels 120 may extend outwardly from the cart 100 when in a folded position to allow the cart 100 to be rolled in the folded position. Placing the cart 100 in the folded position may allow for convenient transport or storage thereof.

Figure 10A:
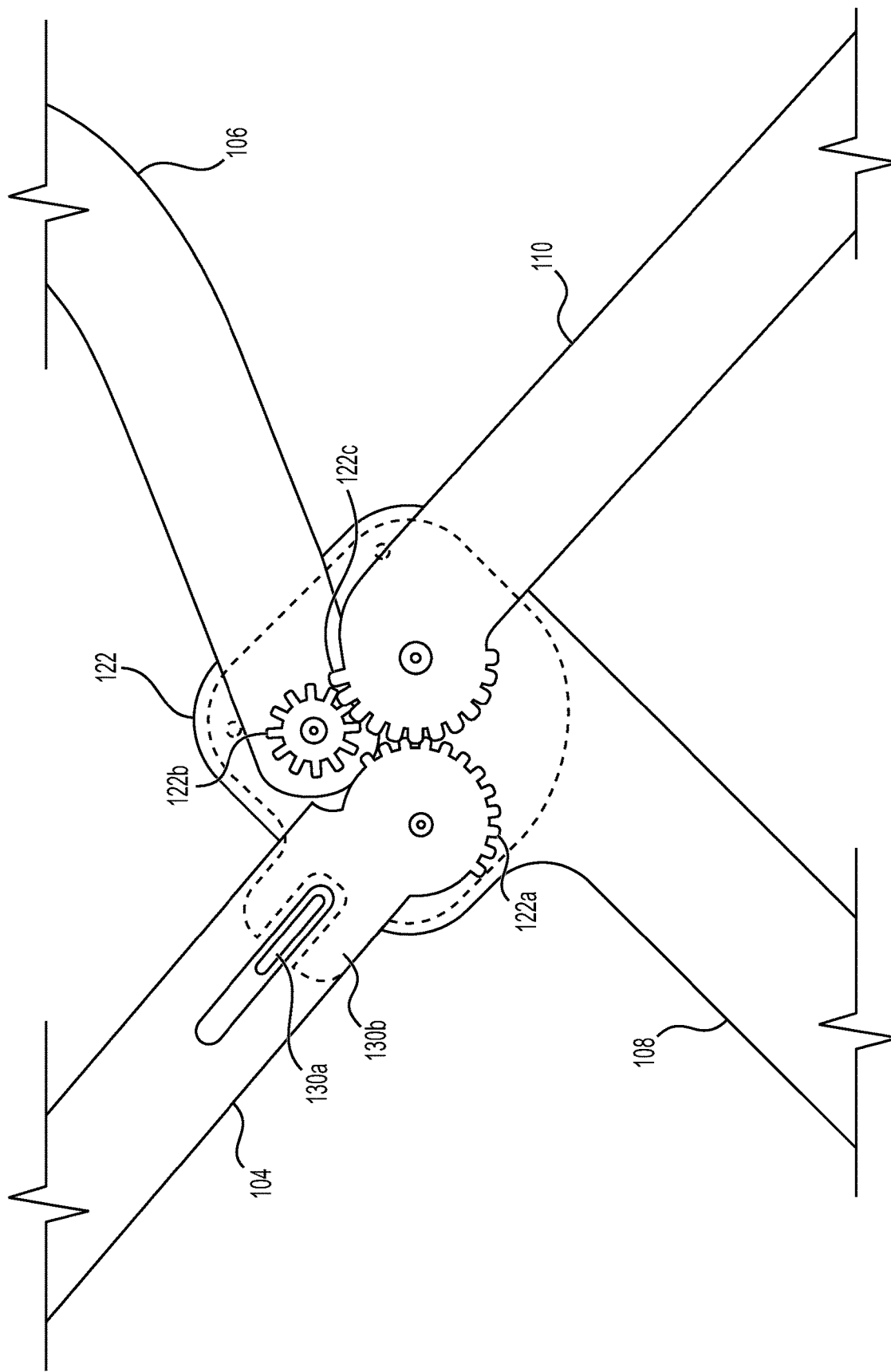
FIG. 10A depicts a folding mechanism when a cart is in an unfolded position according to some embodiments.
Figure 10B:
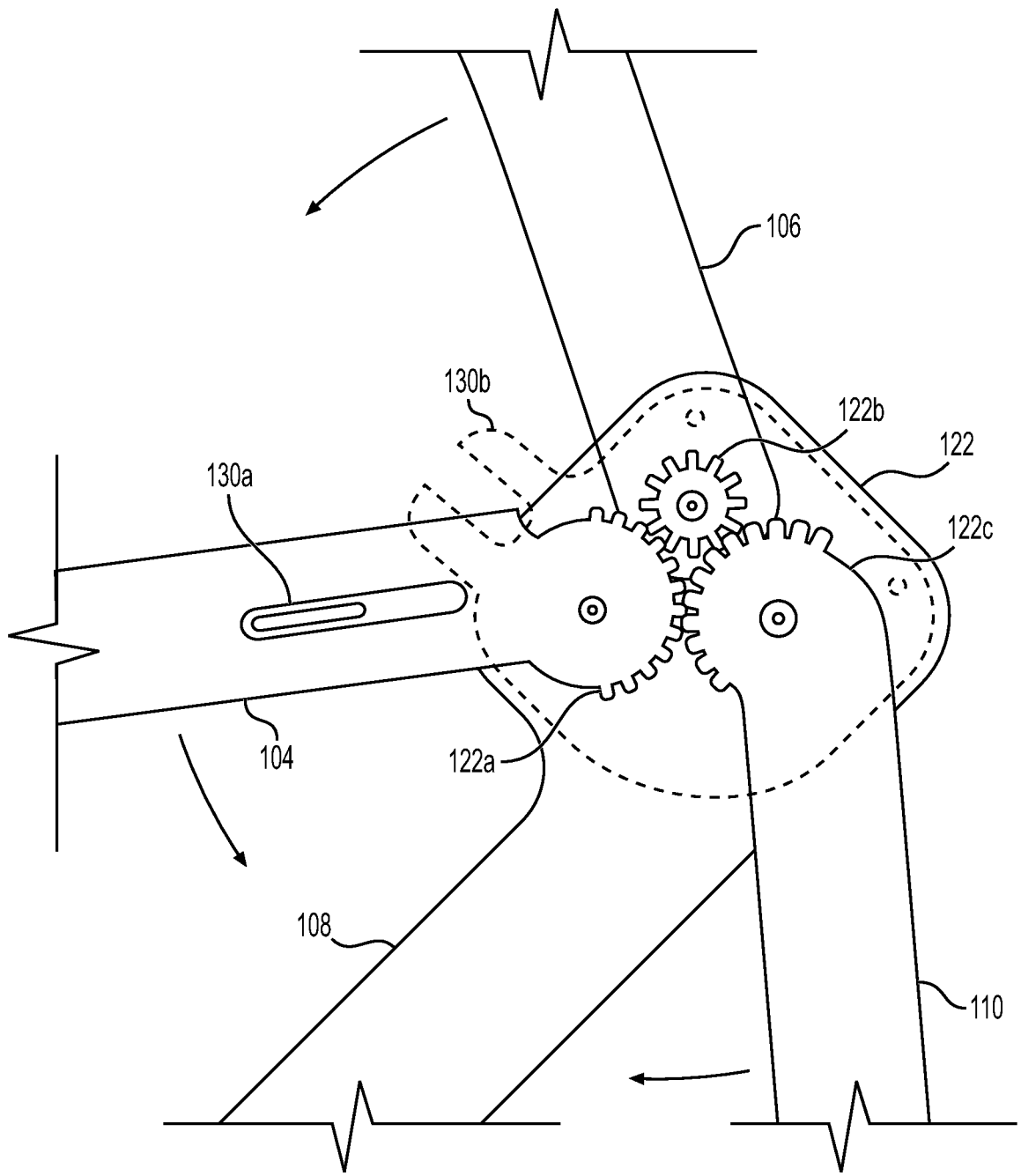
FIG. 10B depicts a folding mechanism when a cart is in a partially folded position according to some embodiments.
Figure 10C:
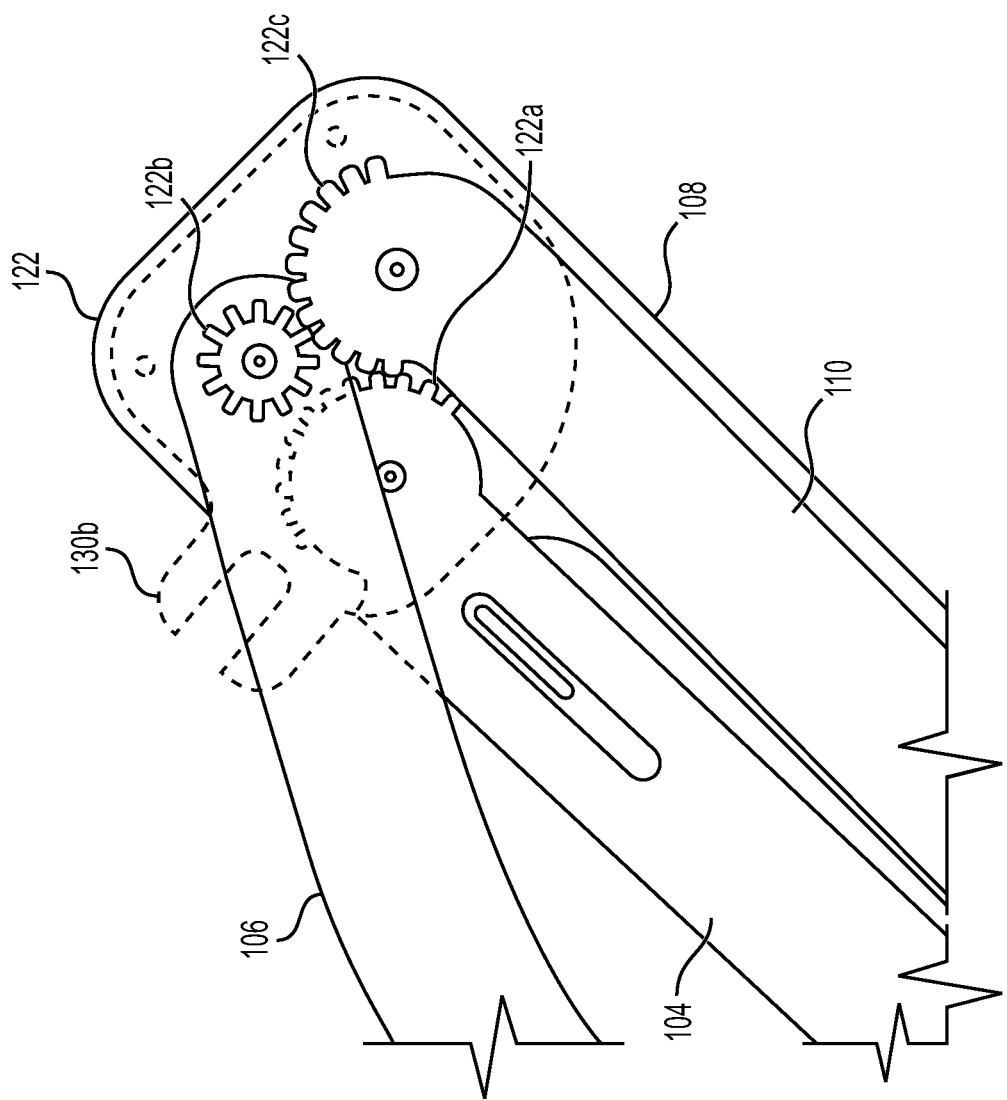
FIG. 10C depicts a folding mechanism when a cart is in a folded position according to some embodiments.

FIGS. 10A-C depict a folding mechanism 122 of the cart 100 during a folding sequence. In some embodiments, the cart 100 may include a folding mechanism 122 on each lateral side. The folding mechanism 122 may include a first gear 122*a*, a second gear 122*b*, and a third gear 122*c*. The first gear 122*a* may be fixed to one of the rear upper support arms 104. The second gear 122*b* may be fixed to one of the front upper support arms 106. The third gear 122*c* may be fixed to one of the front lower support arms 110. In some embodiments, one or more of the first gear 122*a*, the second gear 122*b*, and the third gear 122*c* may be integrated with a respective support arm.

The first gear 122*a*, the second gear 122*b*, and the third gear 122*c* may each be arranged such that a respective rotational axis remains fixed relative to one of the rear lower support arms 108. Thus, the first gear 122*a*, the second gear 122*b*, and the third gear 122*c* may each rotate relative to one of the rear lower support arms 108.

The third gear 122*c* may be meshed with each of first gear 122*a* and second gear 122*b*. First gear 122*a* and second gear 122*b*, however, may be separated so that they do not mesh. Moreover, first gear 122*a* and third gear 122*c* may be gears of a similar size, whereas second gear 122*b* may be a gear of a smaller size, having a diameter less than that of first gear 122*a*, such as half the size, for example. As a result, rotation of the rear upper support arm 104 relative to the rear lower support arm 108 may cause the front upper support arm 106 to rotate in the same rotational or angular direction at a faster rate, such as twice the rate. While a 2:1 gearing ratio is described, it is to be understood that any other suitable gear ratio may be utilized. Further, rotation of the rear upper support arm 104 relative to the rear lower support arm 108 may cause the front lower support arm 110 to rotate in an opposite direction at the same rate.

As shown in FIG. 10B, the locking bolt 130*a* may disengage from the slot of locking plate 130*b*, for example, by sliding upward upon operation of the one or more buttons 128. The locking mechanism 130 may then be in an unlocked position, allowing the various support arms to rotate. If rear upper support arm 104, for example, is rotated by a user, front upper support arm 106 may be caused to rotate in the same angular direction by the folding mechanism 122, albeit at a greater rate. Similarly, front lower support arm 110 may be caused to rotate in an opposite angular direction by the folding mechanism 122.

As shown in FIG. 10C, upon completion of the folding sequence, each of the rear upper support arm 104, front upper support arm 106, rear lower support arm 108, and front lower support arm 110 may be oriented generally in parallel. By orienting each of the support arms in parallel, a size of the cart 100 in its folded position may be minimized for convenient transport and/or storage.

Though not depicted in FIGS. 10A-C, the folding mechanism 122 may further include a spring mechanism which may bias the cart 100 into a folded position. Thus, upon release of the locking mechanism 130 and/or upon a force applied by a user, the spring mechanism may drive each of the support arms into a folded position.

It is to be understood that although FIGS. 10A-C depict one folding mechanism 122 during a folding sequence, in some embodiments a cart 100 may include a folding mechanism 122 on each lateral side such that each folding mechanism 122 would undergo a similar folding sequence when the cart 100 is folded.

Although the exemplary embodiments described above have been disclosed in connection with a personal shopping cart, those skilled in the art will understand that the principles set out above can be applied to any personal transport device and can be implemented in different ways without departing from the scope of the disclosure as defined by the claims. In particular, constructional details, including manufacturing techniques and materials, are well within the understanding of those of skill in the art and have not been set out in any detail here. These and other modifications and variations are well within the scope of the present disclosure and can be envisioned and implemented by those of skill in the art.

Other exemplary embodiments of the present disclosure will be apparent to those skilled in the art from consideration of the specification and practice of the exemplary embodiments disclosed herein. It is intended that the specification and examples be considered as exemplary only, and departures in form and detail may be made without departing from the scope and spirit of the present disclosure as defined by the following claims.

What is claimed is:

1. A cart, comprising:
a first set of lower support arms and a second set of lower support arms, each of the lower support arms having a wheel attached thereto;
a first set of upper support arms and a second set of upper support arms;
a holding frame coupled to the first set of upper support arms and the second set of upper support arms;
a locking mechanism configured to releasably lock the cart in an unfolded position; and
a folding mechanism configured to allow the cart to transition between a folded position and unfolded position, wherein during transition:
the first set of upper support arms are moveable relative to the second set of upper support arms;
the first set of lower support arms are moveable relative to the second set of lower support arms; and
the first set of upper support arms are moveable relative to the first set of lower support arms;
wherein the folding mechanism allows rotation of the first set of upper support arms, the second set of upper support arms, and the second set of lower support arms relative to the first set of lower support arms.

2. The cart of claim 1, wherein the folding mechanism further comprises:
a first gear coupled to one of the first set of upper support arms;
a second gear coupled to one of the second set of upper support arms; and
a third gear coupled to one of the second set of lower support arms;
wherein the third gear is meshed with each of the first gear and the second gear.

3. The cart of claim 2, wherein the first gear is not meshed with the second gear.

4. The cart of claim 3, wherein the first gear has a first diameter, the second gear has a second diameter, and the third gear has a third diameter; and
the second diameter is smaller than the first diameter and the third diameter.

5. The cart of claim 4, wherein the second diameter is half of the first diameter.

6. The cart of claim 1, further comprising:
a cross beam attached to the holding frame in at least two locations; and
wherein the holding frame further includes a frame folding mechanism configured to allow the holding frame to fold.

7. The cart of claim 6, further comprising:
a platform attached to the first set of lower support arms and the second set of lower support arms;
wherein the platform includes a folding hinge configured to allow the platform to fold.

8. The cart of claim 1, wherein:
the second set of upper support arms are positioned between a front of the cart and the first set of upper support arms;
during transition from the unfolded position to the folded position, the second set of upper support arms rotate toward the first set of upper support arms in a first rotational direction;
the second set of lower support arms are positioned between a front of the cart and the first set of lower support arms; and
during transition from the unfolded position to the folded position, the second set of lower support arms rotate toward the first set of lower support arms in a second rotational direction that is opposite the first rotational direction.

9. The cart of claim 8, further comprising:
a cross beam attached to the holding frame in at least two locations; and
at least two bags, each of the at least two bags being supported by the holding frame and the cross beam, wherein a plurality of clips are attached in an interleaved manner to the cross beam.

10. The cart of claim 1, further comprising:
one or more bags supported by the holding frame;
wherein the one or more bags have one or more clips attached thereto, the clips being configured to attach to the holding frame.

11. The cart of claim 1, wherein the holding frame is configured to support at least four bags, the four bags being capable of arrangement in a two-by-two formation.

12. The cart of claim 1, further comprising:
a handle; and
one or more buttons integrated in the handle, the one or more buttons configured to toggle the locking mechanism from a locked position to an unlocked position.

13. The cart of claim 12, wherein the locking mechanism further includes:
a locking plate fixed to one of the lower support arms; and
a locking bolt configured to engage with the locking plate to place the locking mechanism in a locked position and to disengage from the locking plate to place the locking mechanism in an unlocked position.

14. The cart of claim 13, wherein the one or more buttons are operably coupled to the locking bolt such that the locking bolt may be selectively disengaged upon operation of the one or more buttons; and
wherein the folding mechanism further includes a spring configured to drive the cart into a folding position upon unlocking of the locking mechanism.

15. A cart comprising:
a first set of lower support arms and a second set of lower support arms, each of the lower support arms having a wheel attached thereto;
a first set of upper support arms and a second set of upper support arms;
a holding frame coupled to the first set of upper support arms and the second set of upper support arms;
a locking mechanism configured to releasably lock the cart in an unfolded position; and a folding mechanism configured to allow the cart to move between a folded position and unfolded position, the folding mechanism including:
- a first gear coupled to one of the first set of upper support arms;
- a second gear coupled to one of the second set of upper support arms; and
- a third gear coupled to one of the second set of lower support arms;

wherein the third gear is meshed with each of the first gear and the second gear;

wherein the first gear has a first diameter, the second gear has a second diameter, and the third gear has a third diameter; and wherein the second diameter is less than the first diameter and less than the third diameter.

16. The cart of claim 15, wherein rotation of the first set of upper support arms in a first direction at a first rate causes rotation of the second set of upper support arms in the first direction at a second rate, the second rate being greater than the first rate.

17. The cart of claim 16, wherein rotation of the first set of upper support arms in the first direction at the first rate causes rotation of the second set of lower support arms in a second direction at the first rate, the second direction being opposite the first direction.

18. The cart of claim 17, wherein rotation of the first set of upper support arms in the first direction to a position parallel with the first set of lower support arms causes the second set of upper support arms and the second set of lower support arms to be parallel with the first set of lower support arms.

19. A cart, comprising:
- a first set of lower support arms and a second set of lower support arms, each of the lower support arms having a wheel attached thereto;
- a first set of upper support arms and a second set of upper support arms;
- a handle attached to the first set of upper support arms;
- a holding frame attached to the first set of upper support arms and the second set of upper support arms, the holding frame including a frame folding mechanism configured to allow the holding frame to fold;
- four bags, the bags being removably attached to the holding frame by a plurality of clips coupled to the bags, the bags being arranged in a two-by-two formation;
- a locking mechanism including a locking plate and a locking bolt, wherein the locking bolt is configured to be selectively engaged with the locking plate to lock the cart in an unfolded position; and
- a folding mechanism configured to allow the cart to transition between a folded position and unfolded position, the folding mechanism including:
  - a first gear coupled to one of the first set of upper support arms;
  - a second gear coupled to one of the second set of upper support arms; and
  - a third gear coupled to one of the second set of lower support arms;

wherein the third gear is meshed with each of the first gear and the second gear;

wherein during transition:
- the first set of upper support arms are moveable relative to the second set of upper support arms;
- the first set of lower support arms are moveable relative to the second set of lower support arms; and
- the first set of upper support arms are moveable relative to the first set of lower support arms.

20. The cart of claim 19, further comprising:
a cross beam attached to the holding frame in at least two locations, wherein the plurality of clips are attached in an interleaved manner to the cross beam.

* * * * *